US011935412B2

(12) United States Patent
Yasui

(10) Patent No.: US 11,935,412 B2
(45) Date of Patent: Mar. 19, 2024

(54) INFORMATION SUPPLY METHOD AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/702,846

(22) Filed: Mar. 24, 2022

(65) Prior Publication Data
US 2022/0319325 A1 Oct. 6, 2022

(30) Foreign Application Priority Data

Mar. 30, 2021 (JP) ................................. 2021-057600

(51) Int. Cl.
*H04N 5/44* (2011.01)
*B60W 50/14* (2020.01)
*G06V 20/58* (2022.01)
*G08G 1/16* (2006.01)

(52) U.S. Cl.
CPC ............. *G08G 1/162* (2013.01); *B60W 50/14* (2013.01); *G06V 20/58* (2022.01); *G08G 1/166* (2013.01); *B60W 2050/143* (2013.01); *B60W 2050/146* (2013.01)

(58) Field of Classification Search
CPC ....... G08G 1/162; G08G 1/166; B60W 50/14; B60W 2050/143; B60W 2050/146; B60W 2040/0818; B60W 30/09; B60W 30/0956; B60W 40/08; B60W 2300/36; B60W 2420/42; B60W 30/08; G06V 20/58
See application file for complete search history.

(56) References Cited

U.S. PATENT DOCUMENTS 11,396,271 B2 * 7/2022 Kourous-Harrigan ....................... B60R 21/34
2005/0107955 A1 * 5/2005 Isaji ....................... B60W 30/08 340/436

(Continued)

FOREIGN PATENT DOCUMENTS

JP 2019-096056 6/2019
WO 1997/014584 4/1997

OTHER PUBLICATIONS

Japanese Office Action for Japanese Patent Application No. 2021-057600 dated Dec. 13, 2022.

(Continued)

*Primary Examiner* — Munear T Akki
(74) *Attorney, Agent, or Firm* — Amin, Turocy & Watson, LLP

(57) ABSTRACT

An information supply method causes a computer of a terminal device equipped with a camera and mounted in a mobile object to execute: a process of acquiring an image; a process of determining an alert level for an operator of the mobile object is a first alert level or a second alert level that is a level lower than the first alert level based on a surrounding situation of the mobile object obtained from the image; and a process of displaying information appropriate to the alert level on a display provided on a casing in which the camera of the terminal device is provided in accordance with a result of the determination.

17 Claims, 28 Drawing Sheets

(56) References Cited

U.S. PATENT DOCUMENTS

| | | | | |
|---|---|---|---|---|
| 2015/0269448 A1* | 9/2015 | Kosaki | .................. | G06V 20/58 |
| | | | | 382/103 |
| 2019/0122543 A1* | 4/2019 | Matus | .................. | G08G 1/0133 |
| 2022/0327932 A1* | 10/2022 | Nakaya | ................ | G08G 1/0133 |

OTHER PUBLICATIONS

Released two-camera drive recorder for handling photographing an image in front of and behind a vehicle "DRV-MR740" and two-camera drive recorder for handling photographing a vehicle interior "DRV-MP740," JVC Kenwood Corporation, Sep. 5, 2018.

* cited by examiner

FIG. 28

| SCENARIO | | DISPLAY | |
|---|---|---|---|
| THERE IS POTENTIAL RISK IN FORWARD DIRECTION | | CAUTION (↑) | PASSING IS NOT EXECUTED |
| THERE IS POTENTIAL RISK IN LEFT DIRECTION | | CAUTION (←) | |
| THERE IS POTENTIAL RISK IN RIGHT DIRECTION | | CAUTION (→) | |

INFORMATION SUPPLY METHOD AND STORAGE MEDIUM

CROSS-REFERENCE TO RELATED APPLICATION

Priority is claimed on Japanese Patent Application No. 2021-057600, filed Mar. 30, 2021, the content of which is incorporated herein by reference.

BACKGROUND

Field

The present invention relates to an information supply method and a storage medium.

Description of Related Art

In the related art, a vehicle that includes an imaging device and an alarm device and outputs an alarm to the alarm device based on a processing result of an image captured by the imaging device is known (see Japanese Unexamined Patent Application, First Publication No. 2019-96056).

SUMMARY

However, in the foregoing technology, convenience for a user of a mobile object deteriorates in some cases.

The present invention has been devised in view of such circumstances and an objective of the present invention is to provide an information supply method, an application program, and a processing device capable of improving convenience for a user.

An information supply method and a storage medium according to the present invention adopt the following configurations.

(1) According to an aspect of the present invention, there is provided an information supply method of causing a computer of a terminal device equipped with a camera and mounted in a mobile object to execute: a process of acquiring an image; a process of determining an alert level for an operator of the mobile object is a first alert level or a second alert level that is a level lower than the first alert level based on a surrounding situation of the mobile object obtained from the image; and a process of displaying information appropriate to the alert level on a display provided on a casing in which the camera of the terminal device is provided in accordance with a result of the determination.

(2) According to another aspect of the present invention, there is an information supply method of causing a computer of a terminal device equipped with a camera and mounted in a mobile object to execute: a process of acquiring an image; a process of determining whether an alert level for an operator of the mobile object is equal to or higher than a predetermined level based on a surrounding situation of the mobile object obtained from the image; and a process of displaying information indicating that the alert level is equal to or higher than the predetermined level on a display provided on a casing in which the camera of the terminal device is provided and causing a light-emitting device to execute passing when the alert level is equal to or higher than the predetermined level.

(3) In the aspect of (1) or (2), the computer may further execute: a process of determining a direction in which the operator is alert based on the surrounding situation; and a process of displaying an image indicating that the alert direction on the display.

(4) In the aspect of any one of (1) to (3), the computer may further execute: a process of displaying an image of first color on the display when the alert level is the first alert level; and a process of displaying an image of second color different from the first color when the alert level is a second alert level lower than the first alert level.

(5) In the aspect of any one of (1) to (4), the computer may further execute: a process of determining whether the alert level is a first alert level, a second alert level lower than the first alert level, or a third alert level lower than the second alert level, based on the surrounding situation; and a process of displaying information appropriate to the alert level on the display in accordance with a result of the determination.

(6) In the aspect of any one of (1) to (5), the computer may further execute: a process of determining that the alert level is the first alert level when a traffic participant being gazed at is present within a range of a first distance from the terminal device or is present within a range of the first distance within a predetermined time from a present time; and a process of determining that the alert level is a second alert level lower than the first alert level when the traffic participant is present within a range of a second distance more away than the first distance from the terminal device and is not present within the range of the first distance from the terminal device or is predicted to be present within the range of the second distance within the predetermined time from the present time and is not present within the range of the first distance within the predetermined time from the present time.

(7) In the aspect of any one of (1) to (6), the computer may further execute: determining that the alert level is equal to or higher than a predetermined level and displaying the information on the display when a traffic participant is present or predicted to be present in an alert region which is a range of a predetermined angle at which a reference direction is a reference; setting the alert region in front of the mobile object when the mobile object is traveling straight ahead; setting the alert region in front of and in a left direction from the mobile object when the mobile object turns left; and setting the alert region in front of and in a right direction of the mobile object when the mobile object turns right.

(8) In the aspect of (7), the computer may further execute: determining that the alert level is the first alert level when traffic participants are present or predicted to be present in regions a, b, and c or, and displaying information regarding the first alert level in accordance with the regions in which the traffic participants are present or predicted to be present on the display; and determining that the alert level is a second alert level lower than the first alert level when traffic participants are present or predicted to be present in regions d, e, and f, and displaying information regarding the second alert level on the display in accordance with the regions in which the traffic participants are present or predicted to be present. The region a may be a range of a first angle at which the reference direction is a reference and is a range of a first distance from the terminal device. The region b may be a range between the first angle in a left direction of the reference direction and a second angle greater than the first angle at which the reference direction is a reference, and is a range of the first distance. The region c may be a range between the first angle in a right direction of the reference direction and the second angle at which the reference direction is a reference, and is the range of the first distance. The region d may be a range between the first angle and the second angle at which the reference direction is a reference, and is a range between the first distance to a second distance more away than the first distance from the terminal device. The region e may be a range between the first angle in the left direction of the reference direction and the second angle, and is a range between the first and second distances. The region f may be a range between the first angle in the right direction of the reference direction and the second angle, and is a range between the first and second distances.

(9) In the aspect of (8), the computer may further execute: displaying information indicating an alert in a forward direction, a left direction, or a right direction from the mobile object at the first alert level on the display when traffic participants are present or predicted to be in the regions a, b, and c; and displaying information indicating that the forward direction, the left direction, or the right direction of the mobile object is alert at the second alert level on the display when traffic participants are present or predicted to be in the regions d, e, and f.

(10) In the aspect of any one of (1) to (9), the computer may further execute: a process of determining whether the alert level is the first alert level, a second alert level lower than the first alert level, or a third alert level lower than the second level based on the surrounding situation; and a process of determining that the alert level is the third alert level when there is a row of objects which are present near the mobile object and extend in a direction identical to a traveling direction of the mobile object.

(11) In the aspect of (10), the computer may further execute: determining that the alert level is the third alert level when a distance between the extending objects is equal to or less than a first threshold and a transverse distance between the extending objects and the mobile object is equal to or less than a second threshold.

(12) In the aspect of any one of (1) to (11), the computer may further execute: a process of determining whether the alert level is the first alert level, a second alert level lower than the first alert level, or a third alert level lower than the second level based on the surrounding situation; and a process of determining that the alert level is the third alert level when the mobile object traveling on a first road enters a second road connected to the first road and objects are present before and after a connection portion of the first and second roads in an extension direction of the first road on the first road.

(13) In the aspect of (12), the computer may further execute determining that the alert level is the third alert level when a distance between the object which will enter the connection portion among the objects before and after the connection portion and an object behind that object is equal to or less than a third threshold.

(14) In the aspect of any one of (1) to (9), the computer may further execute causing a light-emitting device controlled based on an instruction from the computer to execute passing in accordance with the alert level.

(15) In the aspect of (14), the light-emitting device may be provided in a mobile object which is a two-wheeled vehicle and is able to communicate with the computer. The computer may further cause the light-emitting device to execute communication and execute passing.

(16) In the aspect of (14) or (15), the computer may shorten a period of the passing when the alert level is the first alert level than when the alert level is a second alert level lower than the first alert level.

(17) In the aspect of any one of (14) to (16), the computer may further execute a process of determining whether the alert level is the first level, a second alert level lower than the first alert level, and a third alert lever lower than the second alert level, based on the surrounding situation. The computer may further execute a process of determining that the alert level is the third alert level when there is a row of objects which are present near the mobile object and extend in a direction identical to a traveling direction of the mobile object or a process of determining that the alert level is the third alert level when the mobile object traveling on a first road enters a second road connected to the first road and objects are present before and after a connection portion of the first and second roads in an extension direction of the first road on the first road. The information may be displayed on the display and the passing may be executed when the alert level is the first or second alert level. The information may be displayed on the display without executing the passing when the alert level is the third alert level.

(18) According to still another aspect of the present invention, application program causes a computer of the terminal device to execute a process of: acquiring an image; determining an alert level for an operator of a mobile object is a first alert level or a second alert level that is a level lower than the first alert level based on a surrounding situation of the mobile object obtained from the image; and displaying information appropriate to an alert level on a display in accordance with a result of the determination.

(19) According to still another aspect of the present invention, an information supply device includes a camera provided in a casing; a display provided in the casing: a determinator that determines an alert level for an operator of the mobile object is a first alert level or a second alert level that is a level lower than the first alert level based on a surrounding situation of the mobile object obtained from an image captured by the camera; and a display controller that displays information appropriate to the alert level on a display provided on the casing in which the camera of the terminal device is provided in accordance with a result of the determination.

According to (1) to (19), in the information supply method, the application program stored in the storage medium, or the terminal device, information appropriate to the alert level is displayed on the display provided in the casing in which the camera of the terminal device is provided. Thus, it is possible to improve the convenience for a user.

According to (2), by displaying information indicating that the alert level is equal to or higher than the predetermined level on the display and executing the passing, it is possible to execute a report for an operator of the mobile object and the vicinity of the mobile object.

According to (3), in the information supply method, a direction in which the operator is alert can be displayed on the display, and thus the operator can easily recognize the direction in which the operator is alert. Therefore, it is possible to take a behavior to prevent approach to an object.

According to (4), by displaying the information appropriate to the alert level on the display, the user can easily recognize the alert level.

According to (7), in the information supply method, by setting a proper alert region in a traveling direction of the mobile object, it is possible to display the information appropriate to a more proper alert level on the display.

According to (8) or (9), in the information supply method, by displaying the information in accordance with a region in which the operator is alert, it is possible to supply information more useful for the operator.

According to (10) or (11), in the information supply method, for example, by determining a possibility of a traffic participant approaching between vehicles in a situation in which the vehicles are congested and form a vehicle row, it is possible to notify a user of the possibility of a traffic participant approaching. As a result, the user can take a behavior to avoid the approach to a traffic participant that is likely to approach.

According to (12) or (13), in the information supply method, by determining a possibility of a traffic participant approaching from the lateral side of a congested vehicle in a situation in which the vehicle is congested near an intersection, it is possible to notify a user of the possibility of a traffic participant approaching. As a result, the user can take a behavior to avoid the approach to a traffic participant that is likely to approach.

According to (14) to (17), in the information supply method, by executing the passing in accordance with the alert level, it is possible to cause a surrounding traffic participant or the like to recognize presence of the mobile object.

BRIEF DESCRIPTION OF THE DRAWINGS

FIG. 28 is a diagram showing a scenario and a notification in which a potential risk occurs.

DETAILED DESCRIPTION

Hereinafter, a storage medium, an information processing y method, and a terminal device according to an embodiment of the present invention will be described with reference to the drawings. As used throughout this disclosure, the singular forms "a," "an," and "the" include plural reference unless the context clearly dictates otherwise.

Overview 1

Figure 1:
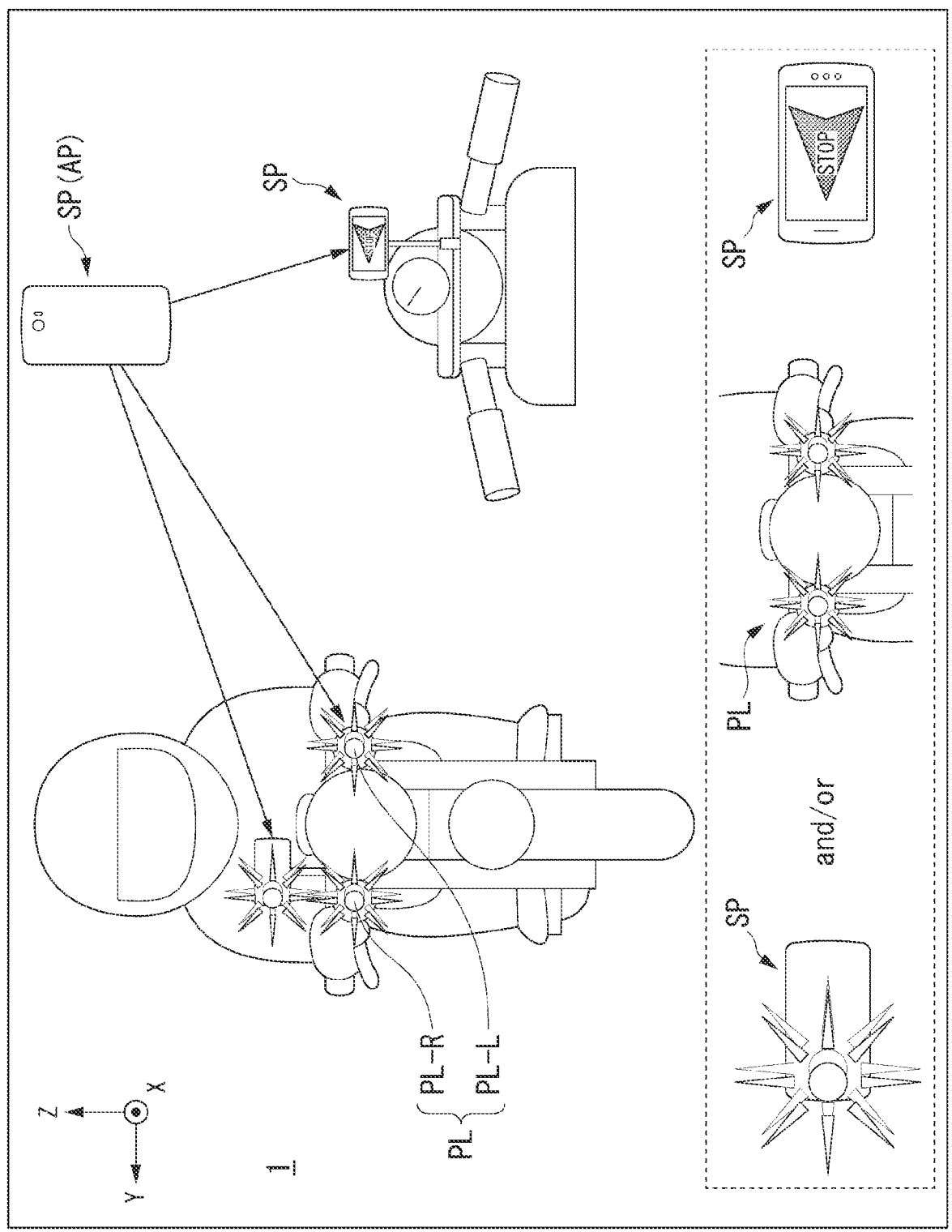
FIG. 1 is a diagram showing an overview of a support system.

FIG. 1 is a diagram showing an overview of a support system 1. In the embodiment, for example, a mobile object is assumed to be a two-wheeled vehicle (hereinafter sometimes referred to as an "own vehicle") in description, but may also be applied to various mobile objects such as a small vehicle or a three-wheeled vehicle. Hereinafter, front and rear directions of the own vehicle are referred to an X direction, a direction orthogonal to the front and rear directions is referred to as a Y direction, a direction orthogonal to the X and Y directions is referred to as a Z direction in some cases.

The support system 1 includes a passing light PL, a terminal device (for example, a smartphone) SP, and an application program AP installed in the terminal device SP. The passing light PL is mounted so that, for example, a light illuminates (passes) the vicinity or the like of a headlight in the positive X direction (the forward direction). In the passing light PL, a passing light PL-R is mounted in the positive Y direction of the vehicle and a passing light PL-L is mounted in the negative Y direction of the vehicle.

In the terminal device SP, a camera and a light are mounted on a first surface of the terminal device SP and a display is displayed on a second surface opposite to the first surface. The terminal device SP is mounted on the own vehicle. The terminal device SP is mounted at a position at which the camera can execute imaging in the positive X direction of the vehicle and the light illuminates in the positive X direction. The terminal device SP is provided at a position at which a driver (an operator) can view the display.

The support system 1 executes passing on traffic participants using one or both of a flash of the terminal device SP and the passing light PL. The support system 1 further displays an alarm on the display of the terminal device SP. Hereinafter, both executing of the passing and displaying of the alarm are referred to as "support" in some cases.

For example, since the braking distance of a two-wheeled vehicle tends to be long, a capability to avoid approach to traffic participants tends to be low. The support system 1 informs a driver of approach to traffic participants early to prevent the approach to the traffic participants and requests the traffic participants to execute cooperation (deceleration, stopping, avoiding, or the like) of the prevention of the approach by reporting a possibility of the approach to the traffic participants by auto-passing of the passing light.

Figure 2:
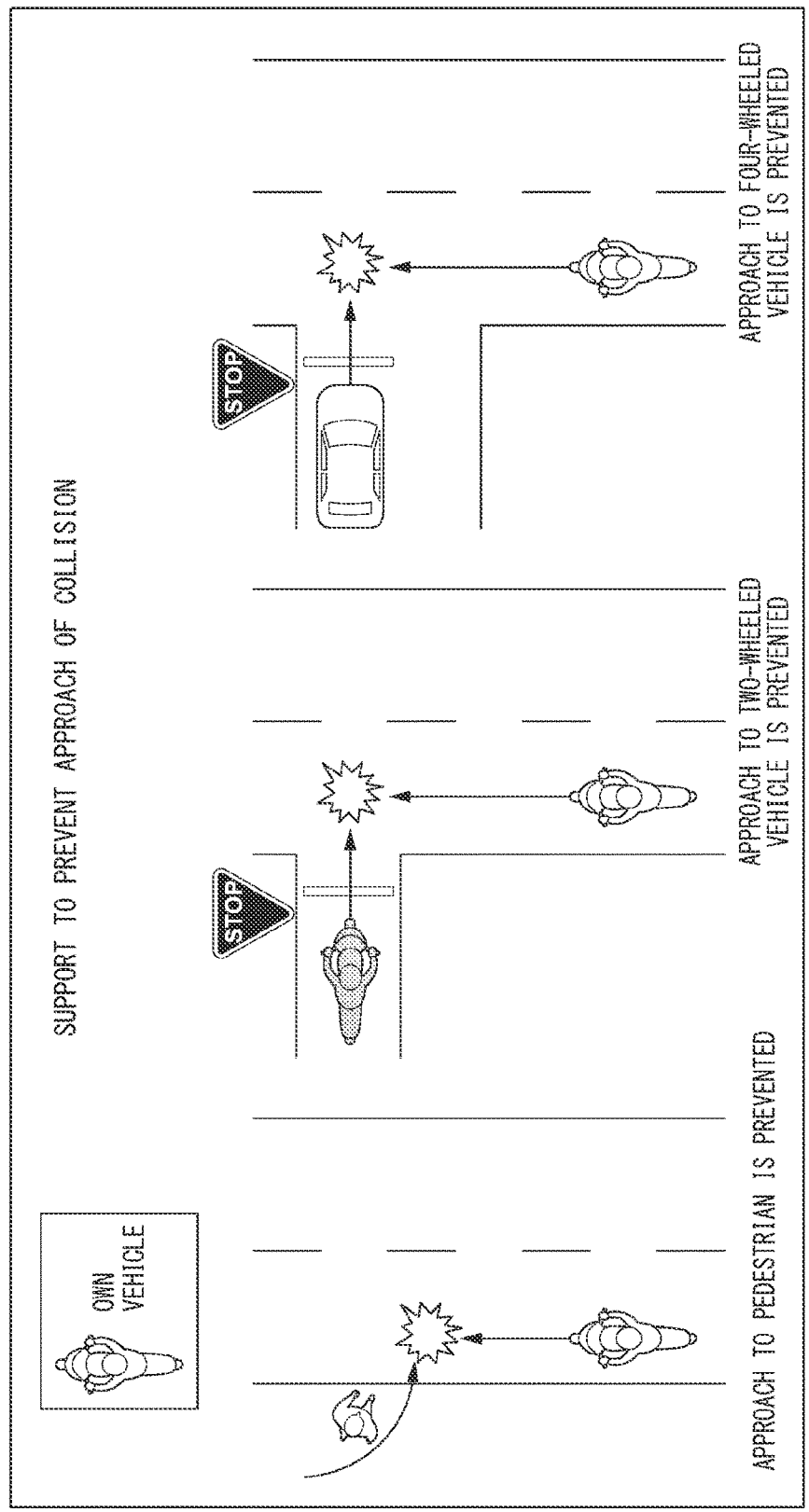
FIG. 2 is a diagram showing an example of a scenario of support.

As shown in FIG. 2, the support system 1 executes support to prevent an approach of a collision when two meet each other. For example, the support system 1 executes support to avoid an approach of the own vehicle to a pedestrian, a two-wheeled vehicle, or a four-wheeled vehicle.

Figure 3:
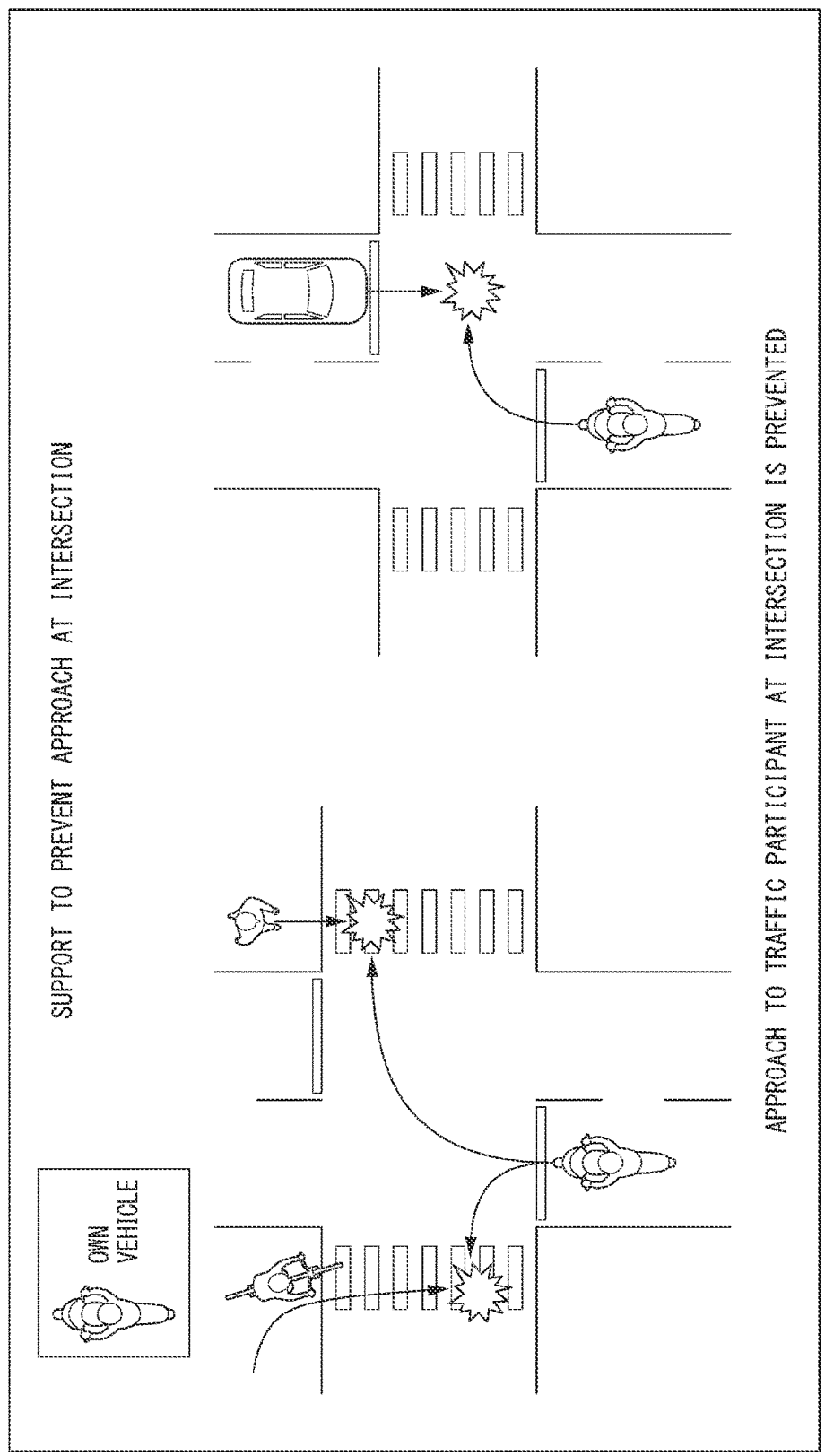
FIG. 3 is a diagram showing another example of the scenario of the support.
Figure 4:
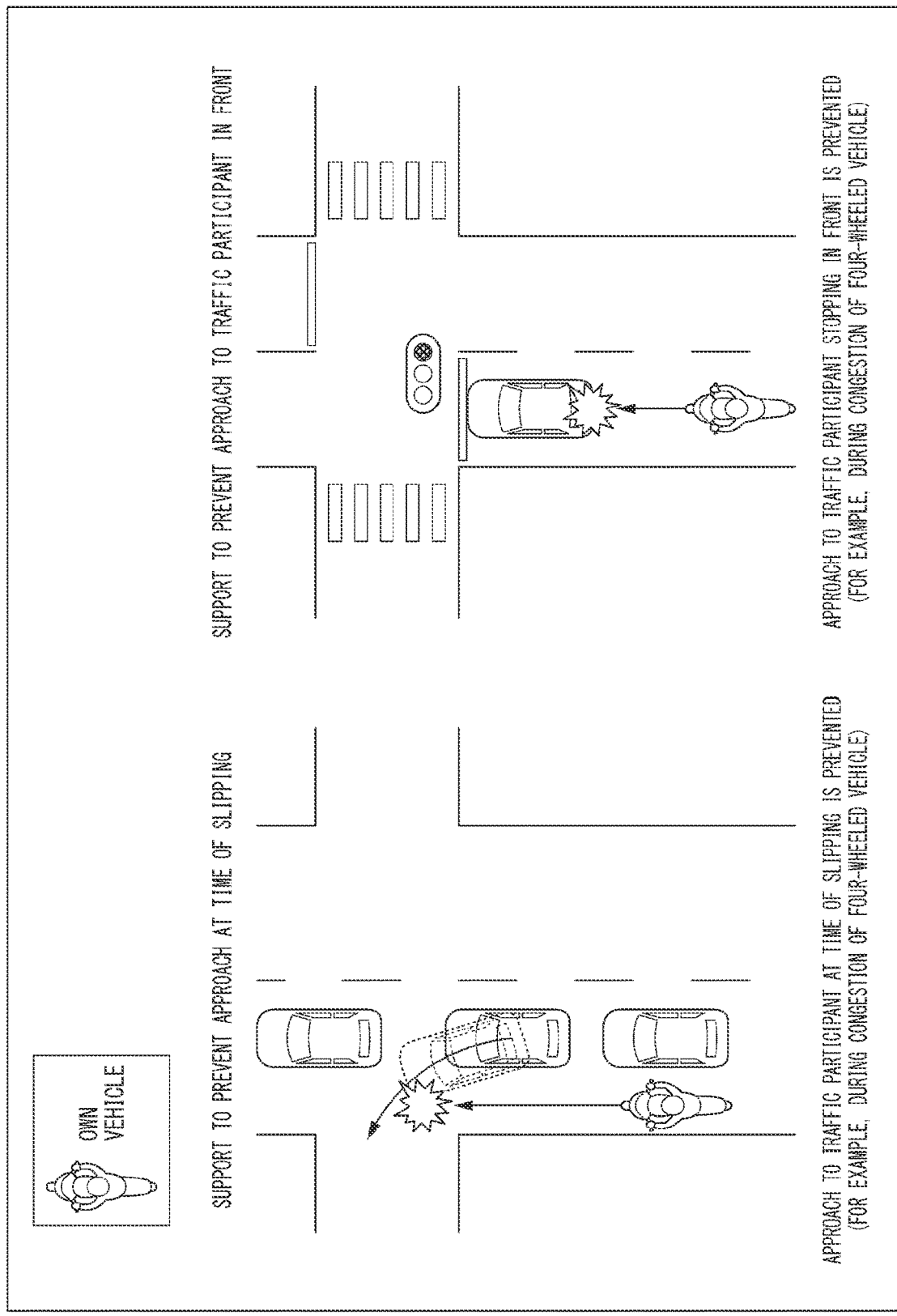
FIG. 4 is a diagram showing still another example of the scenario of the support.

As shown in FIG. 3, the support system 1 executes support to prevent an approach to traffic participants at an intersection. As shown in FIG. 4, the support system 1 executes support to prevent an approach of traffic participants when a four-wheeled vehicle is congested and the own vehicle slips on the side of the four-wheeled vehicle, or executes support to prevent an approach to traffic participants stopping in front.

Figure 5:
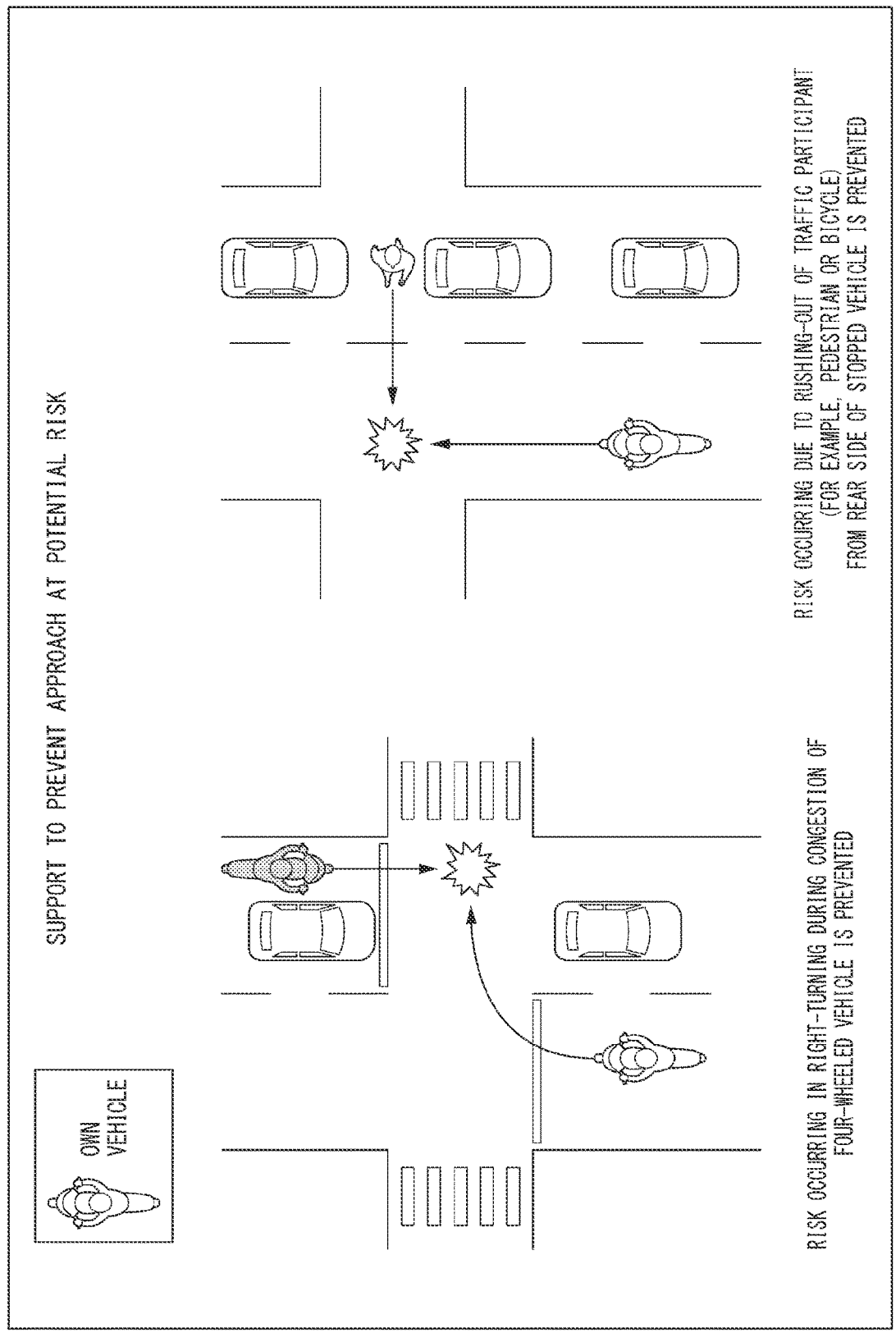
FIG. 5 is a diagram showing still another example of the scenario of the support.

As shown in FIG. 5, the support system 1 executes support to prevent an approach at a potential risk. For example, the support system 1 prevents a risk when the own vehicle turns right during congestion of a four-wheeled vehicle, or prevents a risk when a traffic participant rushes out from the rear side of the stopping vehicle. For example, in the embodiment, when there is a row of objects (four-wheeled vehicles) which are present near the own vehicle and extend in a direction identical to a traveling direction of the own vehicle, as in the right drawing of FIG. 5, it is determined that there is a potential risk. In the embodiment, when the own vehicle traveling on a first road enters a second road connected to the first road (turns right on the first road and enters the second road) as in the left drawing of FIG. 5 and objects (four-wheeled vehicles) are present on front and rear sides a connection portion (an intersection) of the first and second roads in the extension direction of the first road on the first road, it is determined that there is a potential risk. Hereinafter, the details will be described.

Functional Configuration of Support System

Figure 6:
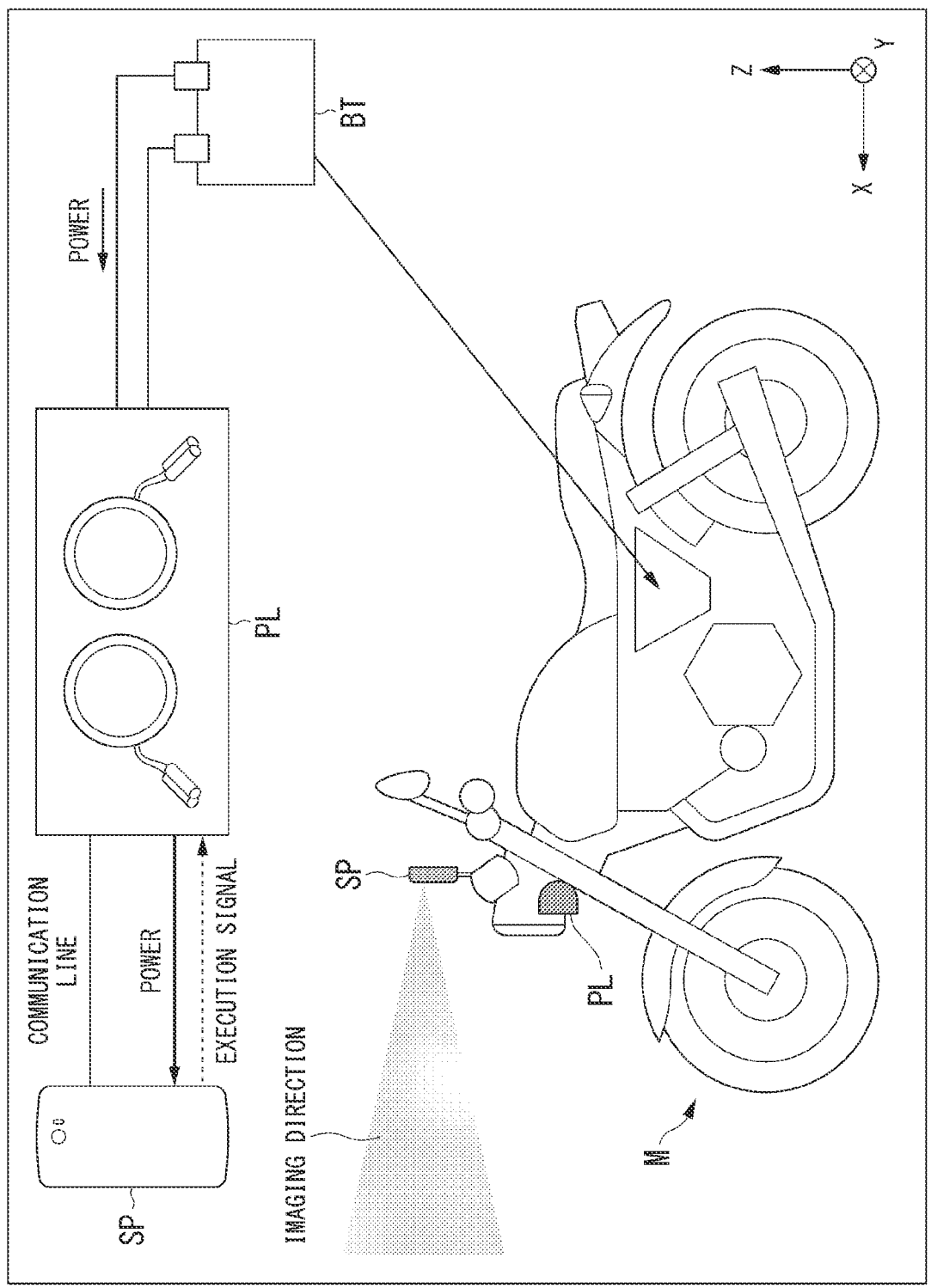
FIG. 6 is a diagram showing an example of a functional configuration of the support system.

FIG. 6 is a diagram showing an example of a functional configuration of the support system 1.

The support system 1 includes the terminal device SP and the passing light PL, for example, as described in FIG. 1. For example, the passing light PL and the terminal device SP are connected with a battery BT of the own vehicle M by a power line and are supplied with power from the battery BT to operate. The terminal device SP may be supplied with power from the battery BT via the passing light PL to operate or may operate with power of a battery mounted on the terminal device SP.

The terminal device SP and the passing light PL are connected by a communication line to communicate with each other. For example, the terminal device SP transmits an execution signal for operating the passing light PL. The passing light PL executes passing in accordance with the execution signal.

Figure 7:
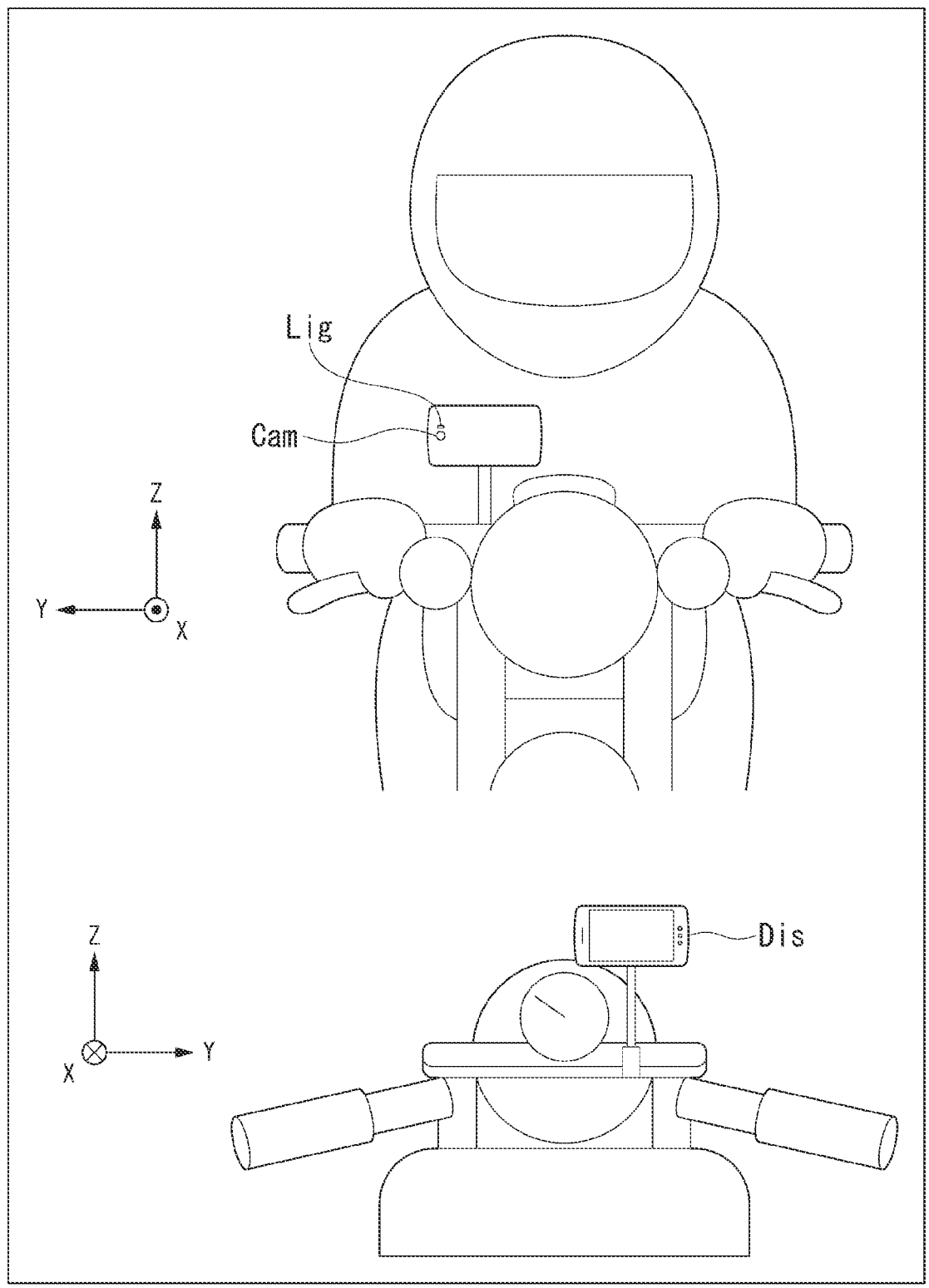
FIG. 7 is a diagram showing an example of a terminal device mounted in an own vehicle.

The terminal device SP is mounted in the own vehicle by a holder, as shown in FIG. 7. For example, a camera Cam of the terminal device SP executes imaging in the positive X direction and a light Lig of the terminal device SP illuminates in the positive X direction, and a display Dis is mounted to be oriented in the negative X direction.

Figure 8:
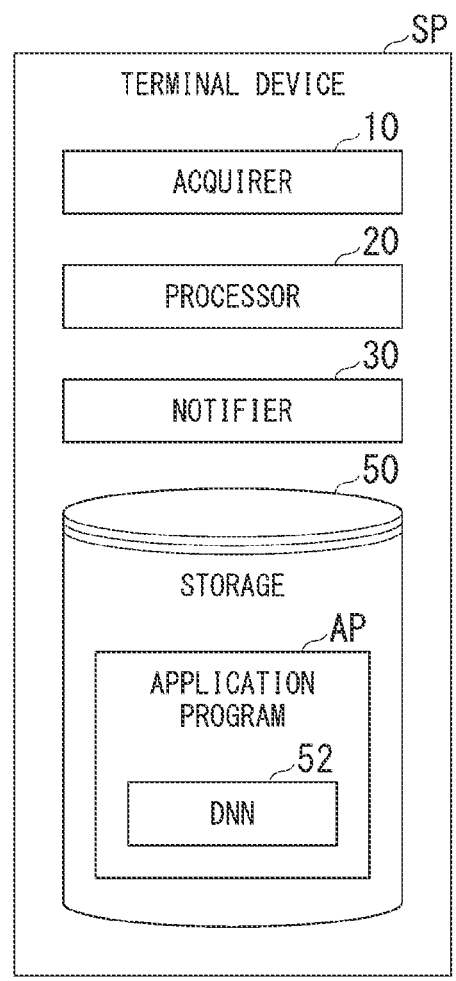
FIG. 8 is a diagram showing an exemplary configuration of functional units or the like of a terminal device.

FIG. 8 is a diagram showing an exemplary configuration of functional units or the like of the terminal device SP. The terminal device SP includes, for example, an acquirer 10, a processor 20, a notifier 30, and a storage 50. The acquirer 10, the processor 20, and the notifier 30 are implemented, for example, by causing a hardware processor such as a central processing unit (CPU) to execute an application program AP (software) stored in the storage 50. For example, the application program AP is supply by a server device that provides the application program AP. The application program AP may be supply by, for example, a service provider that manufactures and sells the own vehicle. The application program AP includes, for example, information functioning as a deep neural network (DNN) 52 to be described below in detail.

Some or all of the constituent elements of the foregoing functional units may be implemented by hardware (a circuit unit including circuitry) such as a large-scale integration (LSI), an application specific integrated circuit (ASIC), a field-programmable gate array (FPGA), or a graphics processing unit (GPU) or may be implemented by software and hardware in cooperation. The application program AP may be stored in advance in a storage device (a storage device including a non-transitory storage medium) such as a flash memory or the like of the storage 50, as described above, or may be stored in a detachably mounted storage medium such as an SD card or the like so that the storage medium (a non-transitory storage medium) is mounted on the terminal device SP to be installed on the storage of the terminal device SP.

The acquirer 10 acquires an image captured by the camera Cam. The processor 20 analyzes the image and executes various processes based on a result of the analysis. The notifier 30 gives a warning indicating an alarm, a caution, or the like to a driver based on a processing result of the processor 20. The details of the process will be described below.

Flowchart

Figure 9:
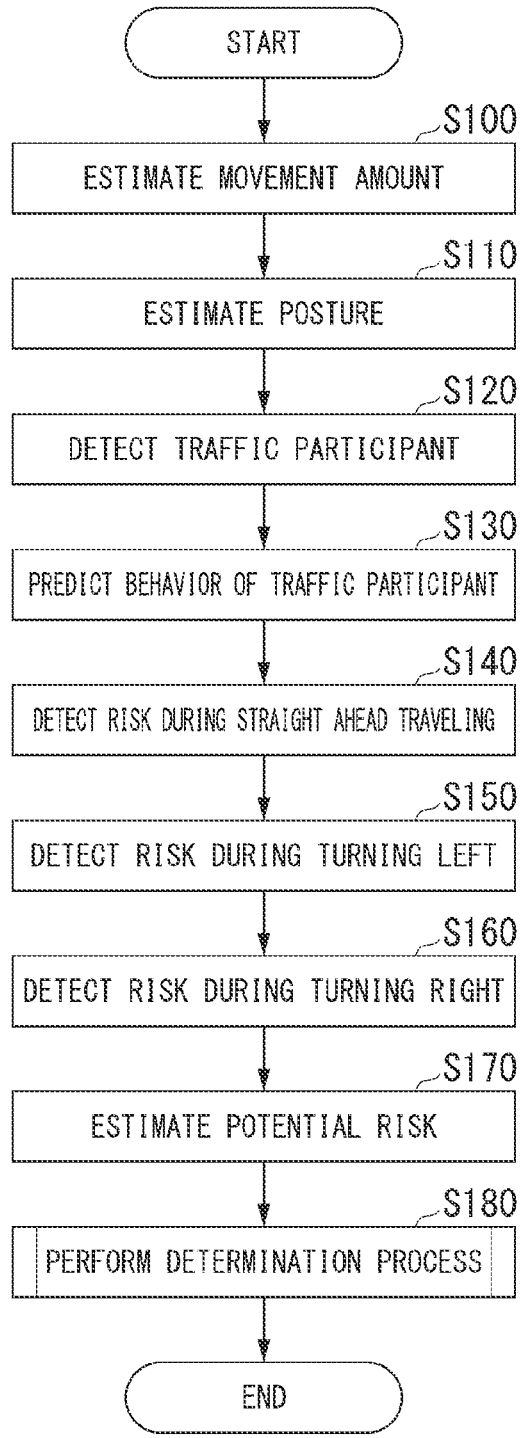
FIG. 9 is a flowchart showing an example of a flow of a process executed by an application program (a terminal device).

FIG. 9 is a flowchart showing an example of a flow of a process executed by an application program (the terminal device SP). First, the terminal device SP estimates a movement amount (step S100) and estimates a posture (step S110). The movement amount is a movement amount of a traffic participant or a movement amount of the own vehicle. The posture is a posture of the own vehicle.

Subsequently, the terminal device SP detects a traffic participant (step S120) and predicts a behavior of the detected traffic participant (step S130). Subsequently, the terminal device SP detects a risk of the own vehicle during straight ahead traveling (step S140), detects a risk during turning left (step S150), and detects a risk during turning right (step S160). Subsequently, the terminal device SP detects a potential risk (step S170). Subsequently, the terminal device SP executes a determination process (step S180).

Figure 10:
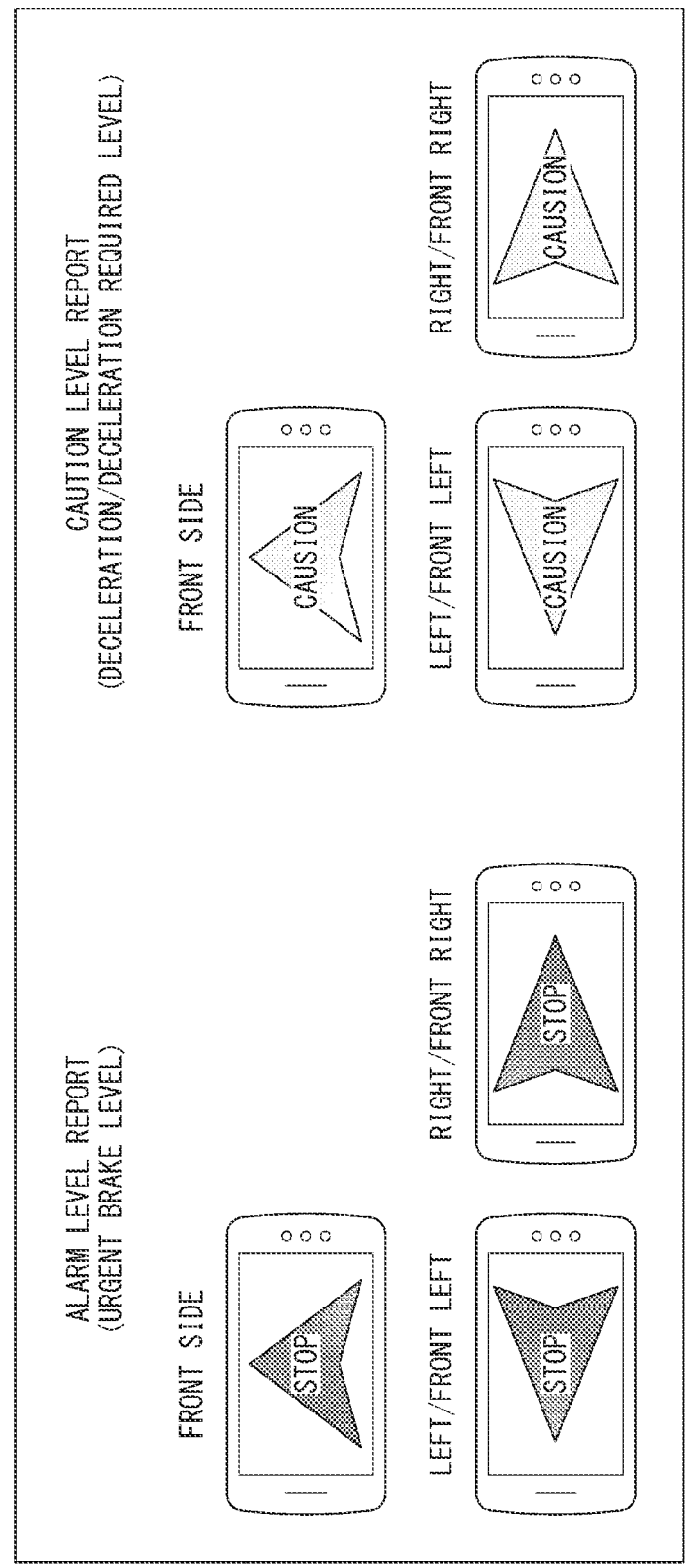
FIG. 10 is a diagram showing an example of an image displayed on a display of the terminal device.

The terminal device SP displays an alarm level report or a caution level report shown in FIG. 10 on the display of the terminal device SP in accordance with a result of the determination in the foregoing determination process. The alarm level report or the caution level report is a report about the front side, a report about the left or the front left, a report about the right or the front right, or the like. Then, a process of one routine of the flowchart ends. Hereinafter, the details of the process will be described.

Estimating Movement Amount

Figure 11:
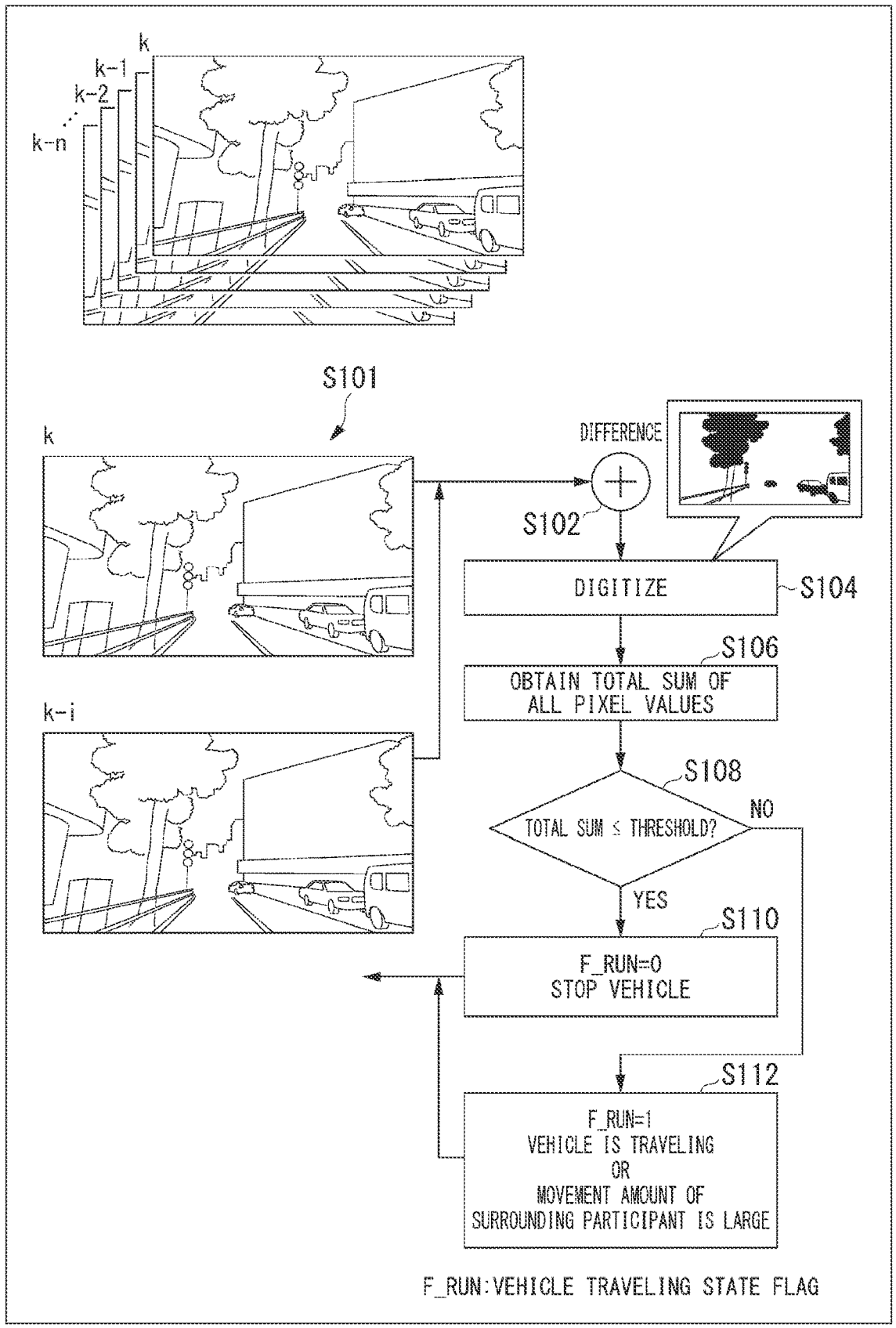
FIG. 11 is a diagram showing a process of estimating a movement amount.

FIG. 11 is a diagram showing a process of estimating a movement amount. The acquirer 10 of the terminal device SP acquires images ("images captured at different times") of a time series (k k-n) captured by the camera Cam (step S101). Subsequently, the processor 20 of the terminal device SP derives a difference between an image captured at a present time and an image captured at an i time earlier among the captured images (step S102). Subsequently, the processor 20 digitizes the derived difference (step S104) and obtains the total sum of all the pixel values (step S106). The total sum of all the pixel values is the total sum of pixels for which it is determined that there is a difference. For example, the processor 20 derives a difference of a luminance value for each pixel and digitizes the difference in accordance with whether the derived difference is equal to or greater than a threshold or is less than the threshold. For example, a pixel with a difference equal to or greater than the threshold is expressed with black color and a pixel with a difference less than the threshold is expressed with white color. Differences of RGB components may be used. In this case, a value obtained by processing a difference of each component statistically may be compared with the threshold and may be digitized for each pixel.

For example, when the own vehicle is not moving (when the own vehicle is stopped), a difference between images is small (similarity is high). Therefore, when the difference is digitized, whiteness increases. For example, when the own vehicle is moving, the difference is large (the similarity is low). Therefore, when the difference is digitized, the whiteness decreases.

Subsequently, the processor 20 determines whether the total sum of all the pixel values is equal to or less than a threshold (step S108). When the total sum is equal to or less than the threshold (when the whiteness is high), the processor 20 determines that the own vehicle is stopping (F_RUN=0) (step S110). When the total sum is not equal to or less than the threshold (when the whiteness is low), the processor 20 determines that the own vehicle is traveling or the movement amount of a surrounding traffic participant is large (F_RUN=1) (step S110).

As described above, the terminal device SP can easily determine a state of the own vehicle or a state of the traffic participant based on an image.

Estimating Posture

Figure 12:
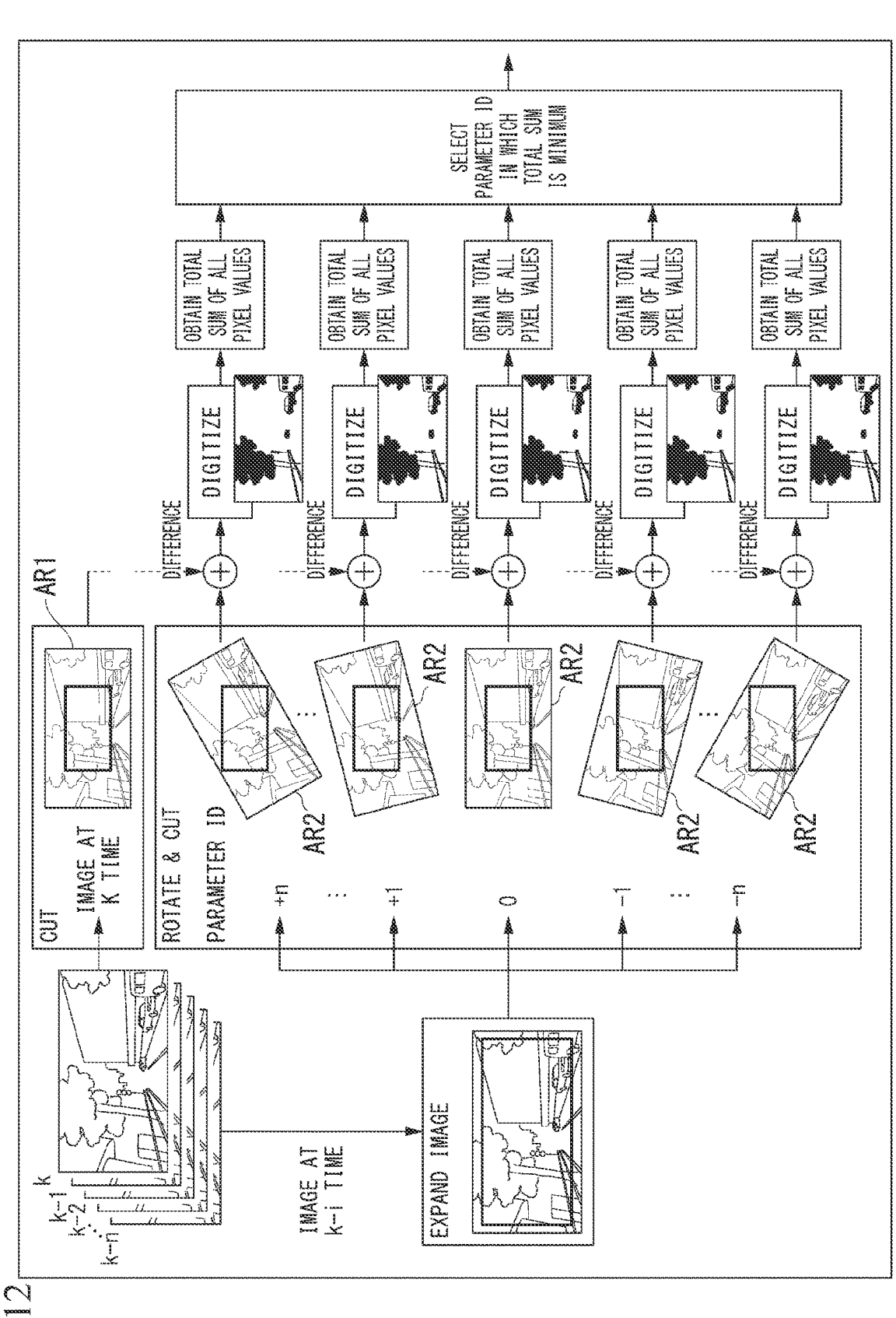
FIG. 12 is a diagram showing a process of determining a posture.

FIG. 12 is a diagram showing a process of determining a posture. The processor 20 cuts out a rectangular region AR1 from an image of a time k among the image of the time series. The rectangular region AR1 is a region centering on a central portion of an image and is a region in which a reference position (for example, a center of gravity or the like) of an image is set at its center. The processor 20 cuts out a region identical or approximate to a region in which the image of the time k is captured from the image at a time k−i among the images of the time series and expands the image of the cutout region so that the image is approximate to the image of the time k. This process is an example of a process of "approximating the size of a cut image in which a specific region is cut from an image captured at the first time to the size of an image captured at the second time."

When the image is expanded, the expansion amount of an image may be determined as follows. For example, when a movement speed of the own vehicle is obtained by a positioning device that measures a position of the terminal device SP, the processor 20 may expand the image by the movement amount of an i sampling time in accordance with the speed of the own vehicle. For example, the processor 20 expands the image with reference to information in which a speed is associated with the degree of expansion. For example, when the speed is obtained, as described above, the processor 20 may expand the image to the degree of an expansion appropriate for the speed. When a speed is not obtained, the processor 20 may expand the image by a predetermined value.

Instead of the foregoing expansion process, adjustment may be executed through image processing so that an imaging range of an image at the time k is matched to an imaging range of an image at a time k−1. For example, the processor 20 may acquire regions including predetermined scenery from the image at the time k and the image at the time k−1 and may contract the size of an image including the region acquired from the image at the time k so that the size of the image is approximated to the size of an image including the region acquired from the image at the time k−1.

Subsequently, the processor 20 acquires a plurality of images obtained by rotating the expanded image each by a predetermined angle in the left and right directions using a reference position as a starting point. For example, images rotated clockwise and counterclockwise about the reference position of the image are acquired. A parameter ID is assigned to the image in accordance with the degree of rotation. For example, images to which parameter ID+1, . . . , and +n are assigned and which are rotated in the left direction and images to which parameter ID−1, . . . , and −n are assigned and which are rotated in the right direction are acquired.

The processor 20 sets a rectangular region AR2 in a region centering on a central portion of an image to which a parameter ID is assigned. The rectangular region AR2 is, for example, a region corresponding to the rectangular region AR1. The rectangular region AR2 is a region which is centered on a central portion of an image without being affected by rotation of the image and in which a reference position of the image is set at its center.

Subsequently, the processor 20 compares an image (which is an example of a "second image") of the rectangular region AR1 at the time k with an image (which is an example of a "first image") of the rectangular region AR1 to which a parameter ID is assigned and derives a difference therebetween. Subsequently, the processor 20 digitizes each derived difference and obtains a total sum of all the pixel values for each image. Further, the processor 20 selects a parameter ID of the image in which the total sum (which is a total sum of the pixels for which it is determined that there is a difference) of all the pixels is the minimum.

When the own vehicle travels straight ahead at the times k and k−i, the parameter ID "0" in FIG. 12 is selected. When the own vehicle is turning left at the times k−i and k, for example, the parameter ID "+n" in FIG. 12 is selected. When the own vehicle is turning right at the times k−i and k, for example, the parameter ID "−n" in FIG. 12 is selected.

Figure 13:
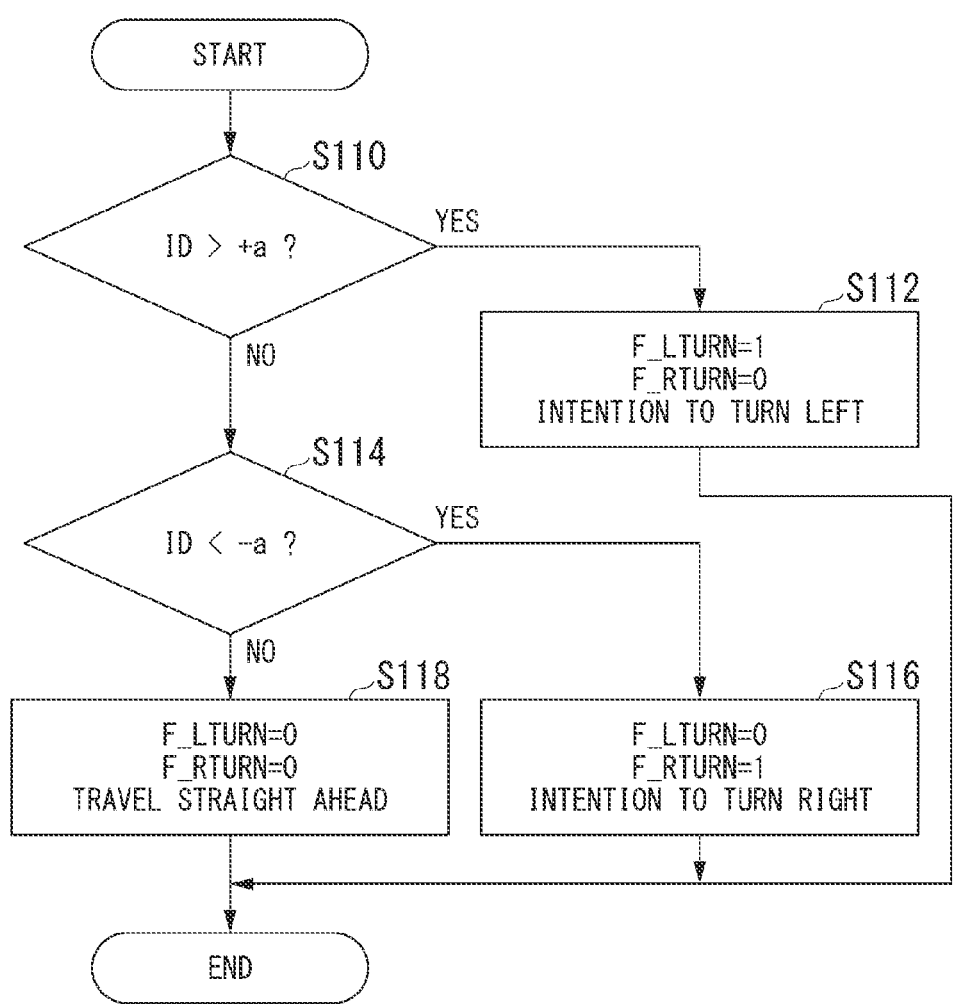
FIG. 13 is a flowchart showing an example of a flow of a process executed by a processor.

FIG. 13 is a flowchart showing an example of a flow of a process executed by the processor 20. First, the processor 20 determines whether the parameter ID is greater than a threshold +a (step S110). When the parameter ID is greater than the threshold +a, the processor 20 determines that the own vehicle has an intention to turn left because the image is rotated left (step S112). It is determined that "F_LTURN=1" and "F_RTURN=0" are satisfied.

When the parameter ID is not greater than the threshold +a, the processor 20 determines whether the parameter ID is less than a threshold −a (step S114). When the parameter ID is less than the threshold −a, the processor 20 determines that the own vehicle has an intention to turn right because the image is rotated right (step S116). It is determined that "F_LTURN=0" and "F_RTURN=1" are satisfied.

When the parameter ID is not less than the threshold −a, the processor 20 determines that the own vehicle has an intention to travel straight ahead (step S118). It is determined that "F_LTURN=0" and "F_RTURN=0" are satisfied. Then, one routine of the flowchart ends.

As described above, the terminal device SP can determine whether the own vehicle has an intention to travel straight ahead or to turn right or left more accurately based on images captured at different times.

Instead of (or in addition to) the foregoing process, the processor 20 may determine whether the own vehicle has an intention to travel straight ahead, an intention to turn right, or an intention to turn left based on a detection result of an acceleration sensor that is mounted on the terminal device SP and can detect an inclination of the terminal device SP. For example, the processor 20 may determine whether the own vehicle has an intention to turn in a direction in which the terminal device SP is inclined.

In the foregoing example, the plurality of prepared images rotated each by the predetermined angle have been described. However, each of one image rotated in the left direction and one image rotated in the right direction may be compared with an image captured at the time k and it may be determined that the own vehicle will travel in a direction corresponding to an image with a small difference. In the foregoing example, the central portions of the images have been compared in the above description. However, instead of the central portions, other regions may be compared. Further, although the imaging interval of an image is equal to or less than a predetermined value and the process of adjusting the size of the image at the time k−i and the image at the time k among the images of the time series (for example, the process of expanding the image at the time k−1) is omitted, the foregoing process may be omitted when it can be determined more accurately whether the own vehicle has the intention to travel straight ahead, the intention to turn right, or the intention to turn left.

Detecting Traffic Participants

Figure 14:
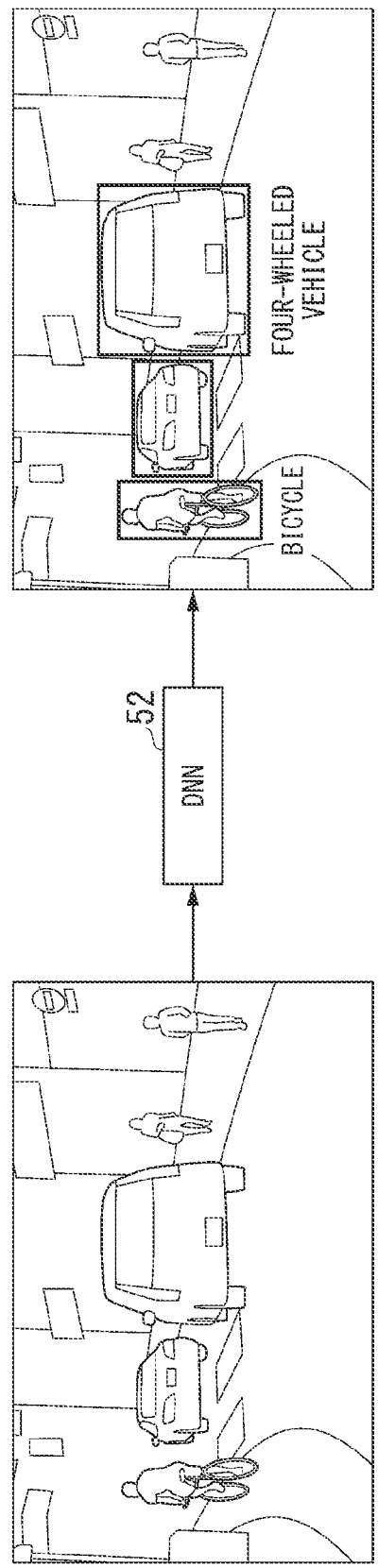
FIG. 14 is a diagram showing a process of detecting traffic participants.

FIG. 14 is a diagram showing a process of detecting traffic participants. The processor 20 identifies kinds of traffic participants in images using the DNN 52. When images are input, the DNN 52 is a learned model that outputs information indicating the kinds of traffic participants included in the images or information for identifying positions of the traffic participants. The kinds of traffic participants are, for example, kinds of traffic participants such as four-wheeled vehicles, two-wheeled vehicles, bicycles, pedestrians, and the like. As the information for identifying the positions, for example, detection boxes which are rectangular regions are associated with the traffic participants. The detection boxes are, for example, regions set so that the traffic participants are included.

Process of Predicting Behaviors of Detected Traffic Participants

Figure 15:
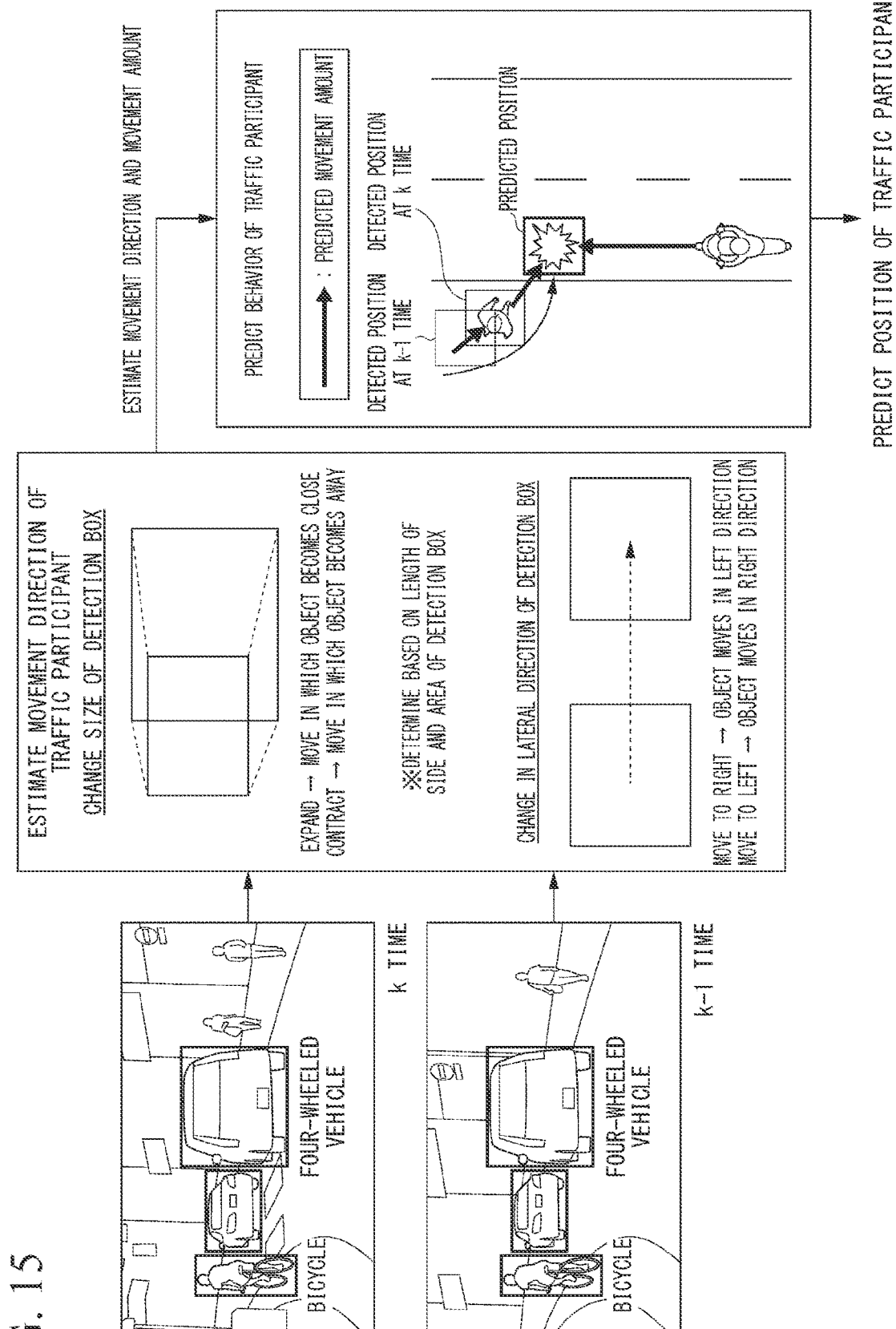
FIG. 15 is a diagram showing a process of predicting behaviors of the detected traffic participants.

FIG. 15 is a diagram showing a process of predicting behaviors of the detected traffic participants. The processor 20 estimates movement directions of the traffic participants based on changes in positions of the traffic participants identified in images captured at different times and predicts behaviors of the traffic participants based on a result of the estimation.

When a detection box associated with a traffic participant obtained from the image at the time k is expanded with respect to a detection box associated with a traffic participant obtained from the image at the time k−1, the processor 20 determines that the own vehicle and the traffic participant tend to become close. In this case, for example, the traffic participant becomes close to the own vehicle or the own vehicle becomes close to the traffic participant.

When a detection box associated with a traffic participant obtained from the image at the time k is contracted with respect to a detection box associated with a traffic participant obtained from the image at the time k−1, the processor 20 determines that the own vehicle and the traffic participant tend to become away. In this case, for example, the traffic participant becomes away from the own vehicle or the own vehicle becomes away from the traffic participant. The processor 20 estimates a movement amount of a traffic participant based on an expansion amount or a contraction amount of the detection box.

When a position of the detection box at the time k is moved to the right with respect to a position of the detection box at the time k−1, the processor 20 determines that a traffic participant moves to the right. When the position of the detection box at the time k is moved to the left, the processor 20 determines that the traffic participant moves to the left. The processor 20 estimates the movement amount of the traffic participant based on the movement amount of the detection box.

The processor 20 estimates the movement direction and the movement amount of the traffic participant, as described above, and predicts the behavior of the traffic participant. The processor 20 predicts a future position of the traffic participant based on detection results of the position of the traffic participant at the time k−1 and the position of the traffic participant at the time k.

Process of Detecting Risk

Risk During Straight Ahead Traveling

Figure 16:
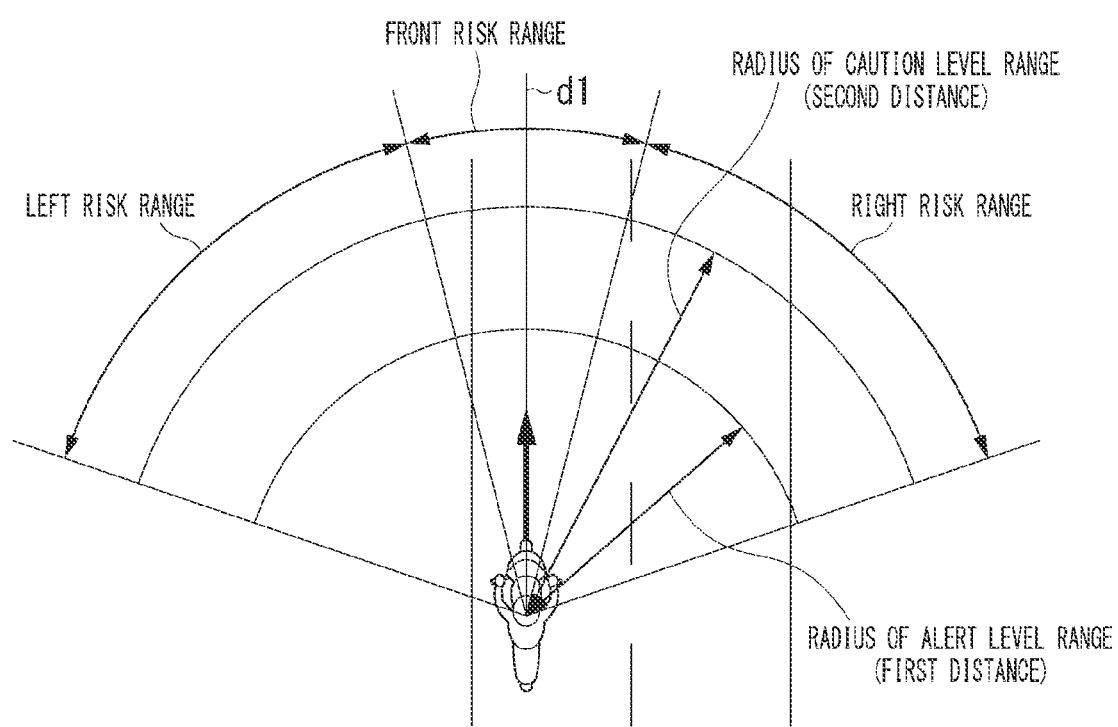
FIG. 16 is a diagram showing an example of definition of a risk during straight ahead traveling.

FIG. 16 is a diagram showing an example of definition of a risk during straight ahead traveling. A risk during straight ahead traveling (a straight-traveling risk) is set in a predetermined range of the front of the own vehicle. A straight-traveling risk is set in a first angle range using a line segment (d1) of a traveling direction of the own vehicle or an extension direction (reference direction) of a road as a reference. A second angle range less than the first angle range is a front risk range when a line segment of the traveling direction is a reference. In a range between the first and second angle ranges, a range in the left direction is a left risk range and a range in the right direction is a right risk range. In the risk ranges, the range of a first distance from the own vehicle is an alert level range and the range of a second distance from the own vehicle is a caution level range.

Hereinafter, when the reference direction (the traveling direction) is a reference, a region in the first angle range and the range of the first distance is referred to as a "region a," a region in a range between the first angle and the second angle (which may be an angle different from the second angle: the same applies below) in the left direction and in the range of the first distance is referred to as a "region b," and a region in a range between the first and second angles in the right direction and the range of the first distance is referred to as a "region c" in some cases (see FIGS. 17, 19, and 21 to be described below).

Figure 17:
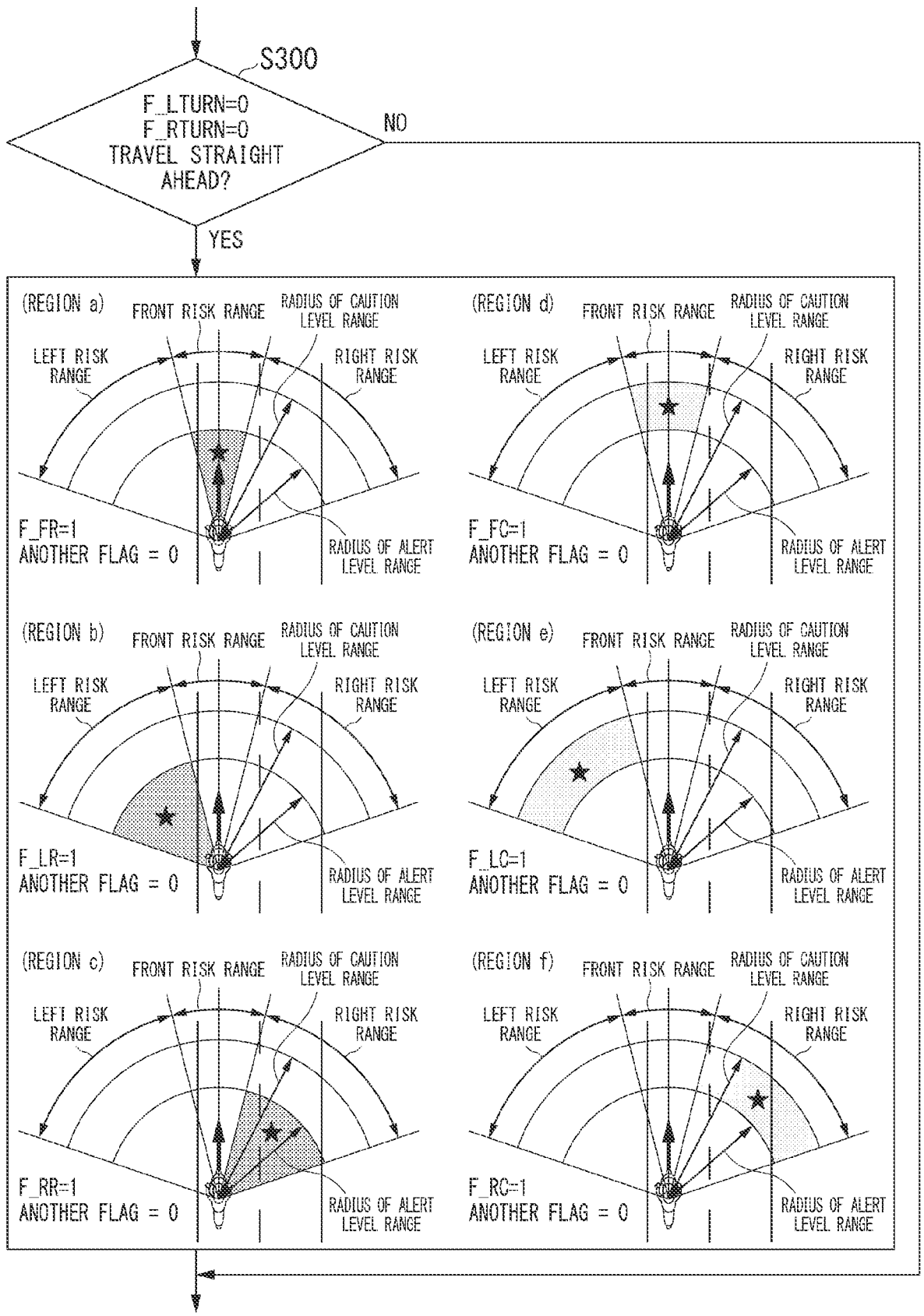
FIG. 17 is a diagram showing an example of a process of determining a risk during straight ahead traveling of an own vehicle.
Figure 19:
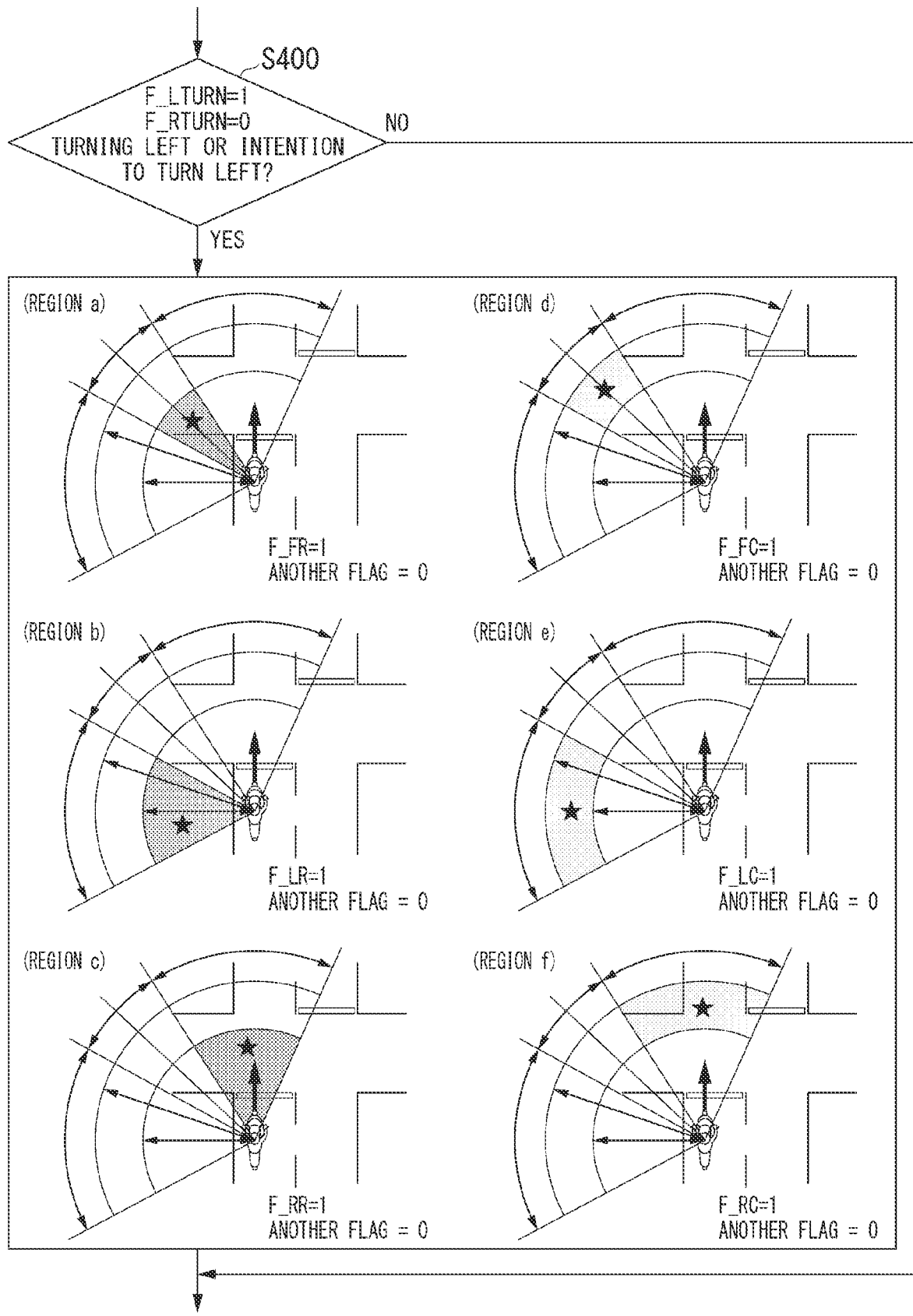
FIG. 19 is a diagram showing an example of a process of determining a risk during turning-left of the own vehicle.
Figure 21:
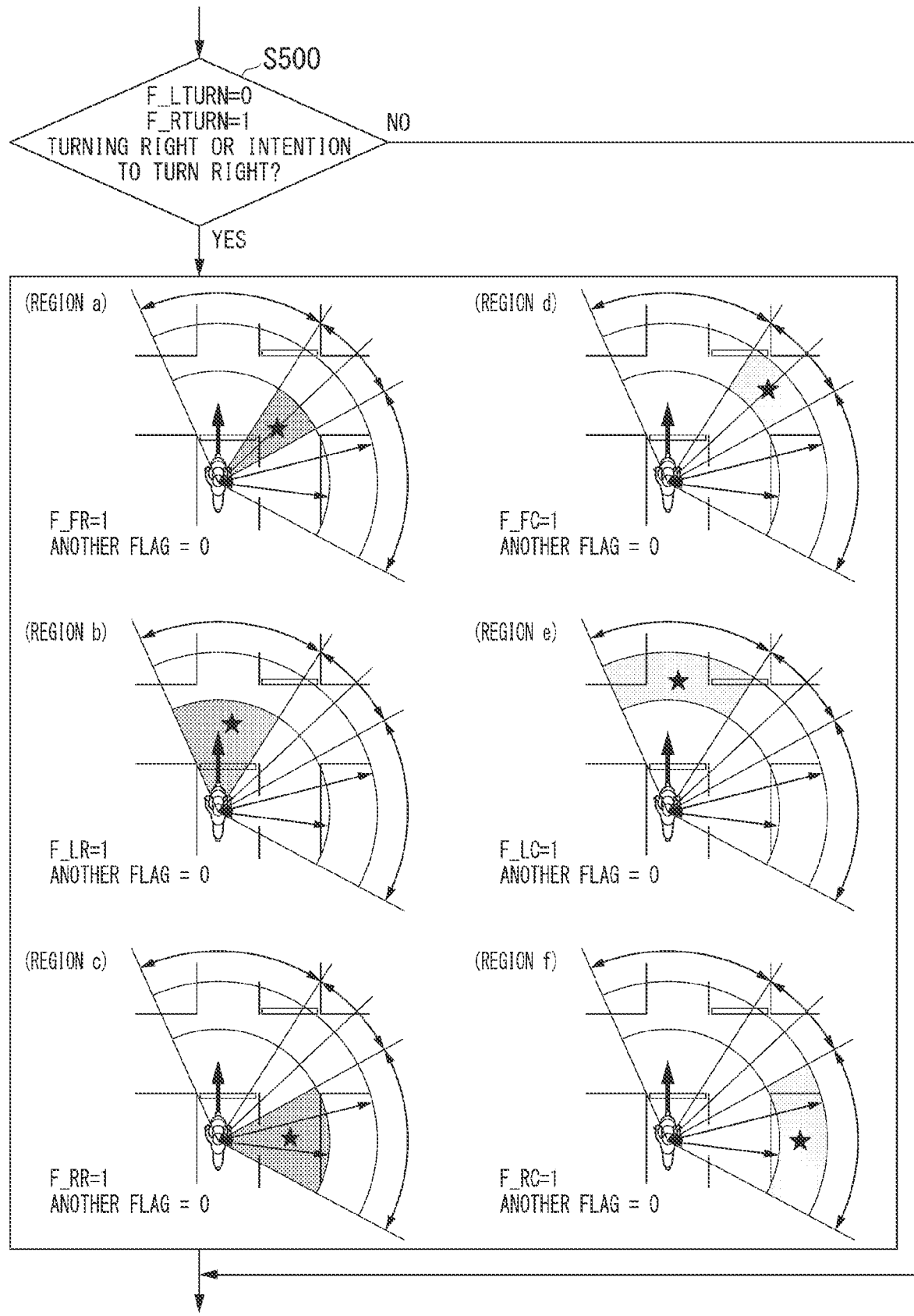
FIG. 21 is a diagram showing an example of a process of determining a risk during turning-right of the own vehicle.

When the reference direction (the traveling direction) is a reference, a region in a range between the first and second angles and the range of the first and second distances is referred to as a "region d," a region in a range between the first angle and second angles in the left direction and in the range of the first and second distances is referred to as a "region e," and a region in a range between the first and second angles in the right direction and the range of the first and second distances is referred to as a "region f" in some cases (see FIGS. 17, 19, and 21 to be described below).

FIG. 17 is a diagram showing a process of determining a risk during straight ahead traveling of the own vehicle. The processor 20 determines whether the own vehicle is traveling straight ahead based on the result of the above-described process (step S300). When the own vehicle is not traveling straight ahead, the process proceeds to a process of step S400 of FIG. 19 to be described below.

When the own vehicle is traveling straight ahead, the processor 20 determines in which region there is a risk of the own vehicle among the region a to the region e. For example, the processor 20 determines in which region a position (a target position) of a target traffic participant (for example, a traffic participant present at a position closest from the own vehicle) or a future position (a target position) of the traffic participant is located among the region a to the region e. In the drawing, "*" denotes a target position.

For example, when a target position is located in the region a, a flag "F_FR=1" is assigned. When the target position is located in the region b, a flag "F_LR=1" is assigned. When the target position is located in the region c, a flag "F_RR=1" is assigned.

For example, when the target position is located in the region d, a flag "F_FC=1" is assigned. When the target position is located in the region d, a flag "F_LC=1" is assigned. When the target position is located in the region e, a flag "F_RC=1" is assigned. In other cases, another flag=0 is assigned.

Risk During Turning Left

Figure 18:
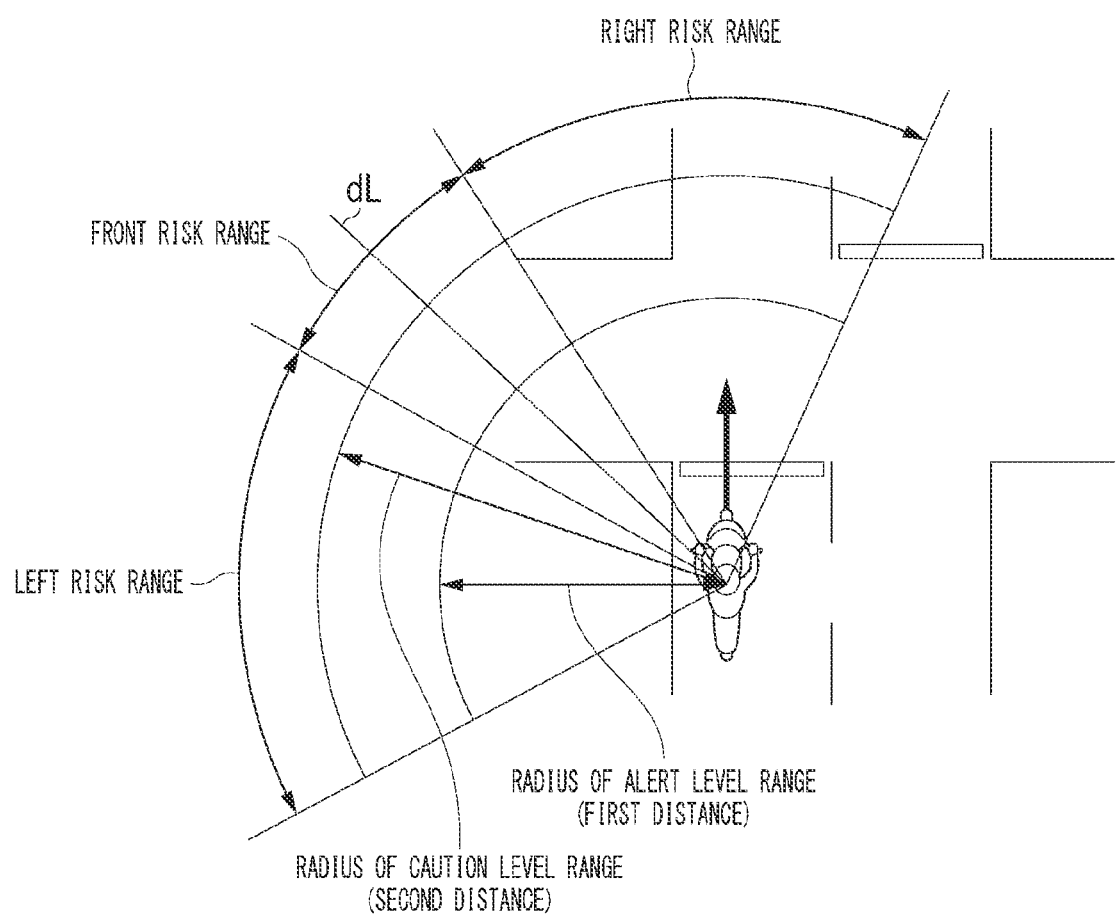
FIG. 18 is a diagram showing an example of definition of a risk during turning left.

FIG. 18 is a diagram showing an example of definition of a risk during turning left. A risk during turning left (a left-turning risk) is set centering on the front left side of the own vehicle. For the straight-traveling risk, a risk is set using a traveling direction of the own vehicle as a reference direction. For the left-turning risk, a risk is set using a line segment (dL) rotated by a predetermined angle in the left direction from the line segment of the traveling direction of the own vehicle instead of the line segment of the traveling direction. The predetermined angle is, for example, an angle within a range from 30 degrees to 60 degrees or angle set in accordance with the shape of a road.

FIG. 19 is a diagram showing an example of a process of determining a risk during turning left of the own vehicle. Based on a result of the above-described process, the processor 20 determines whether the own vehicle is turning left or has an intention to turn left (step S400). When the own vehicle is not turning left and has no intention to turn left, the process proceeds to a process of step S500 of FIG. 21. When the own vehicle is turning left or has the intention to turn left, the processor 20 determines in which region there is a risk of the own vehicle among the region a to the region e.

As described in FIG. 17, the flag "F_FR=1," the flag "F_LR=1," the flag "F_RR=1," the flag "F_FC=1," the flag "F_LC=1," the flag "F_RC=1," or the other flag=0 is assigned in a relation between a target position and the regions.

Risk During Turning Right

Figure 20:
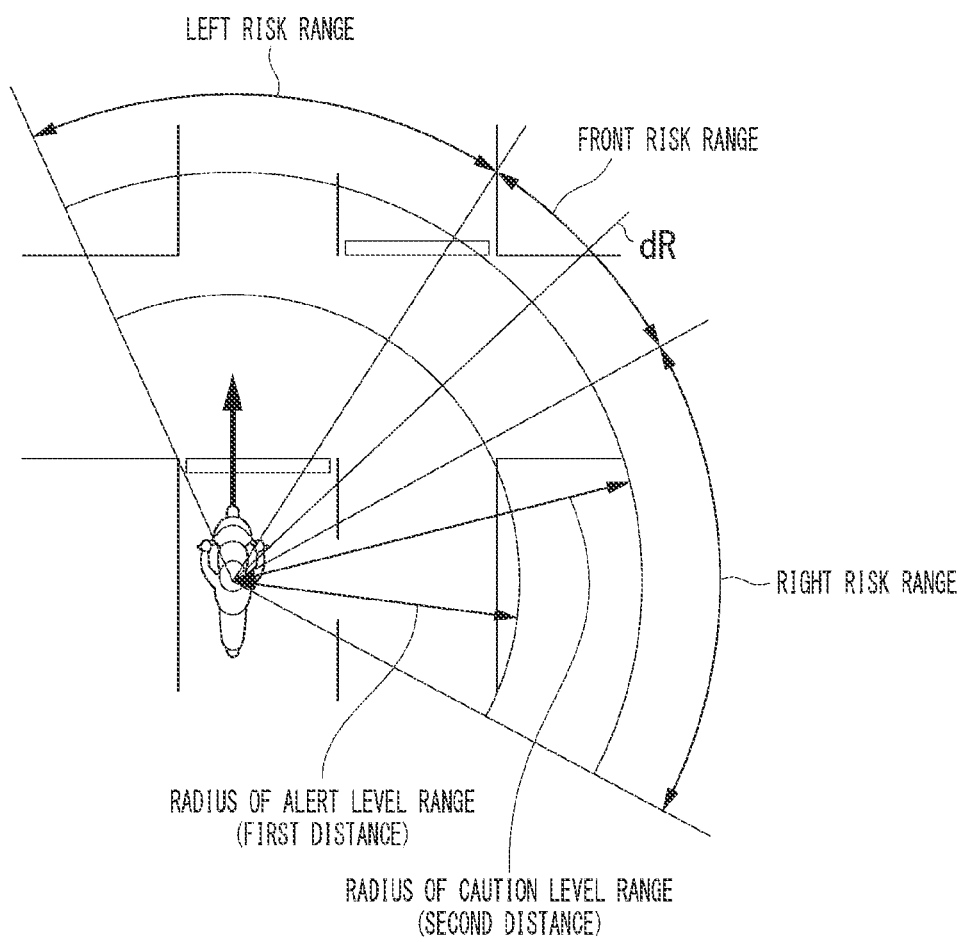
FIG. 20 is a diagram showing an example of definition of a risk during turning right.

FIG. 20 is a diagram showing an example of definition of a risk during turning right. A risk during turning right (a right-turning risk) is set centering on the front right of the own vehicle. For the straight-traveling risk, a risk is set using a traveling direction of the own vehicle as a reference direction. For the right-turning risk, a risk is set using a line segment (dR) rotated by a predetermined angle in the right direction from the line segment of the traveling direction of the own vehicle as a reference instead of the line segment of the traveling direction. The predetermined angle is, for example, an angle within a range from 30 degrees to 60 degrees or angle set in accordance with the shape of a road.

FIG. 21 is a diagram showing an example of a process of determining a risk during turning-right of the own vehicle. Based on a result of the above-described process, the processor 20 determines whether the own vehicle is turning right or has an intention to turn right (step S500). When the own vehicle is not turning right and has no intention to turn right, the process proceeds to a process of step S600 of FIG. 23. When the own vehicle is turning right or has the intention to turn right, the processor 20 determines in which region there is a risk of the own vehicle among the region a to the region e.

As described in FIG. 17, the flag "F_FR=1," the flag "F_LR=1," the flag "F_RR=1," the flag "F_FC=1," the flag "F_LC=1," the flag "F_RC=1," or the other flag=0 is assigned in a relation between a target position and the regions.

As described above, when the own vehicle is traveling straight ahead, the processor 20 sets a risk (an alert region) in front of the own vehicle. When the own vehicle is turning left, a risk is set in the front of and in the left direction of the own vehicle. When the own vehicle is turning right, a risk is set in front of and in the right direction of the own vehicle. In this way, a risk appropriate in the traveling direction of the own vehicle can be set.

Estimating Potential Risk

Figure 22:
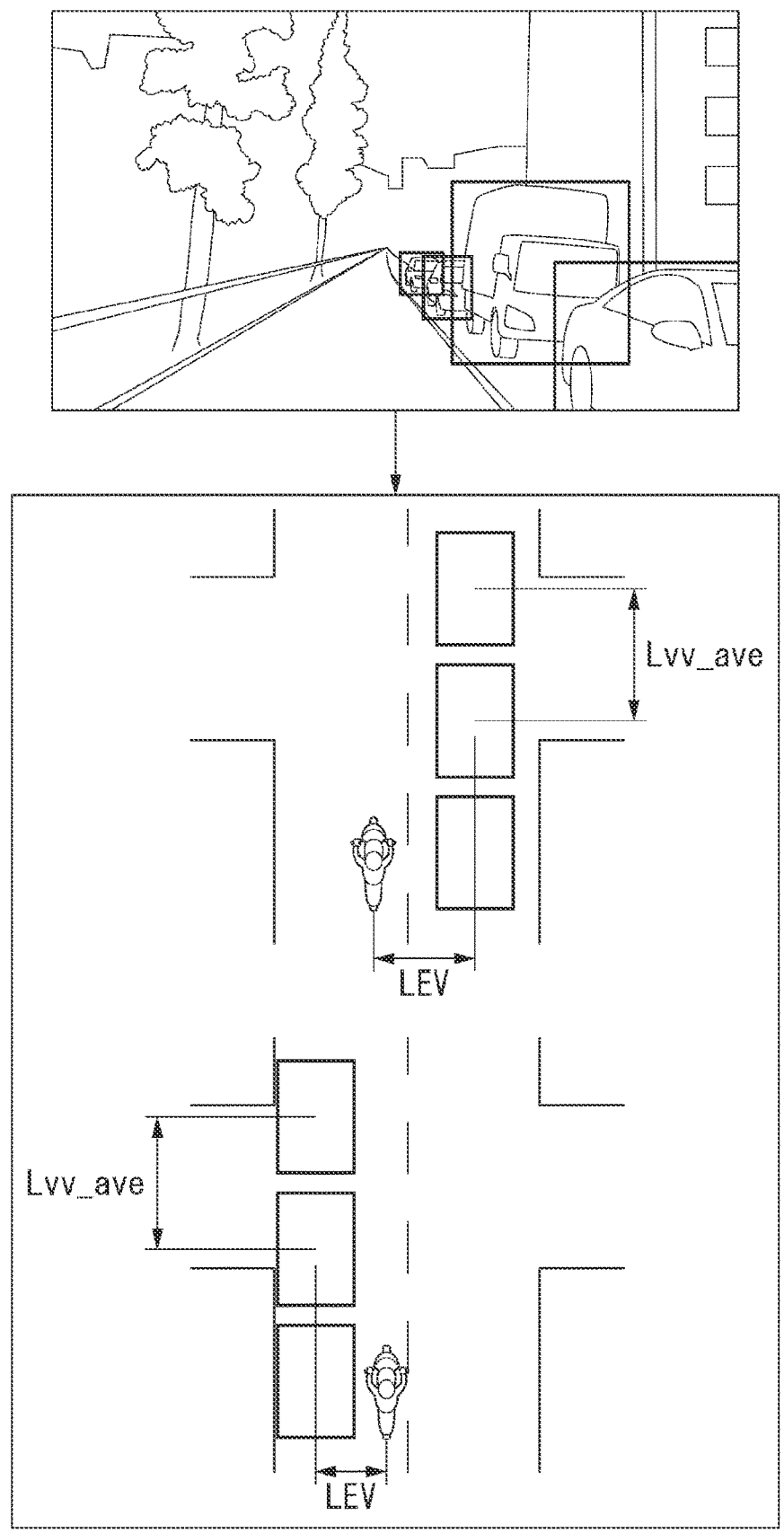
FIG. 22 is a diagram showing an example of a process of estimating a potential risk.

FIG. 22 is a diagram showing an example of a process of estimating a potential risk. The processor 20 detects an average inter-vehicle distance Lvv_ave and a transverse distance Lev based on positions of other vehicles in an image. The average inter-vehicle distance Lvv_ave is, for example, an average inter-vehicle distance of predetermined vehicles (for example, all the vehicles) present from the detected own vehicle to another vehicle. The other vehicle is a vehicle present at a position closest to the own vehicle. An inter-vehicle distance between vehicles is, for example, the distance between reference positions of vehicles forming a row in the traveling direction. When only one vehicle is present, the inter-vehicle distance is set to a large value such as a preset distance (for example, 30 m).

The transverse distance Lev is a distance between the own vehicle and another vehicle in the transverse direction. The other vehicle is, for example, a vehicle present located at a position closest from the own vehicle. The average inter-vehicle distance Lvv_ave and the transverse distance Lev are used for a process related to estimation of the following potential risk.

Figure 23:
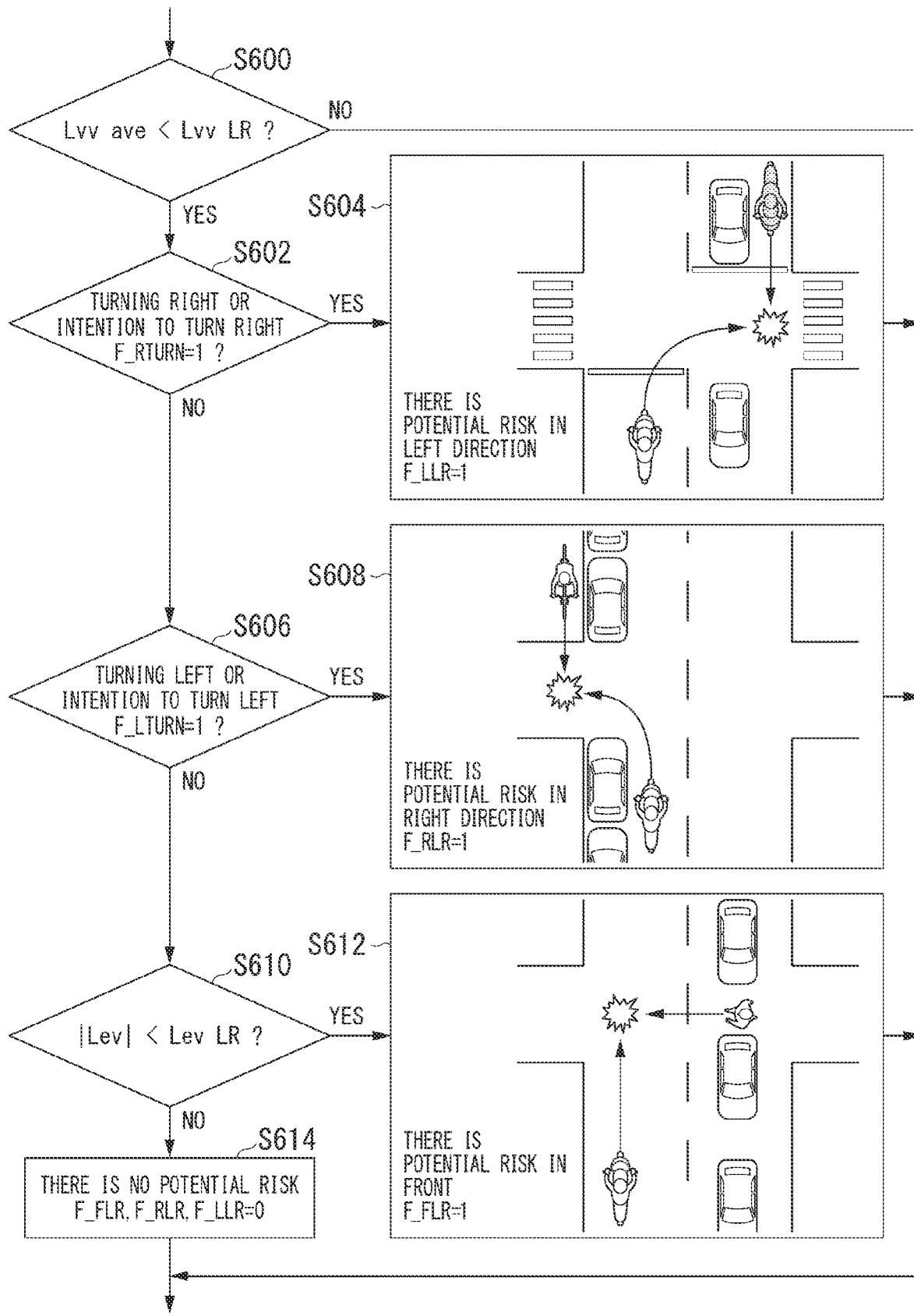
FIG. 23 is a flowchart showing an example of a flow of a process executed by the processor.

FIG. 23 is a flowchart showing an example of a flow of a process executed by the processor 20. The processor 20 determines whether the average inter-vehicle distance Lvv_ave is a threshold Lvv_LR (step S600). The average inter-vehicle distance Lvv_ave is, for example, an average inter-vehicle distance based on a distance between a first object now entering an intersection (a connection portion between first and second roads) and a second object behind the first object in a longitudinal direction or an inter-vehicle distance between the first object and each of objects until an n-th object present behind the second object. In Step S600, it may be determined whether another vehicle is stopping and the average inter-vehicle distance Lvv_ave is the threshold Lvv_LR. When the process of determining whether another vehicle is stopping is omitted in this process to reduce a calculation load and the average inter-vehicle distance Lvv_ave is the threshold Lvv_LR, it is alternatively determined that the other vehicle is stopping. When the average inter-vehicle distance Lvv_ave is not the threshold Lvv_LR, the process proceeds to a process of step S700 of FIG. 24.

When the average inter-vehicle distance Lvv_ave is the threshold Lvv_LR, the processor 20 determines whether the own vehicle is turning right or has an intention to turn right (step S602). When the own vehicle is turning right or has the intention to turn right, the processor 20 determines that there is a potential risk in the left direction (step S604). When there is a potential risk in the left direction, a flag "F_LLR=1" is set.

When the own vehicle is not turning right or has no intention to turn right, the processor 20 determines whether the own vehicle is turning left or an intention to turn left (step S606). When the own vehicle is turning left or has the intention to turn left, the processor 20 determines that there is a potential risk in the right direction (step S608). When there is the potential risk in the right direction, a flag "F_RLR=1" is set.

When the own vehicle turns left, there is a possibility of a traffic participant approaching the own vehicle in the left direction. However, since presence of a traffic participant that is likely to approach can be recognized from a gap between vehicles before turning left, caution is paid to a traffic participant approaching from the right side in which recognition is difficult. When a driver pays caution to the left direction at the time of turning left and the drivers moves her or his face to that direction, a possibility of driving of the driver being unstable is undeniable. Therefore, caution is paid to the right side to prevent the possibility.

When the own vehicle is not turning left or has no intention to turn left, the processor 20 determines whether a transverse distance |Lev| is less than a threshold Lev_LR (step S610). When the transverse distance |Lev| is less than a threshold Lev_LR, the processor 20 determines that there is a potential risk in front of the own vehicle (step S612). When there is the potential risk in front, a flag "F_FLR=1" is set.

When the transverse distance |Lev| is not less than a threshold Lev_LR, the processor 20 determines that there is no potential risk in front (step S614). In this case, "F_LLR=0," "F_RLR=0," and "F_FLR=0" are set.

Process Related to Alarm/Caution

Figure 24:
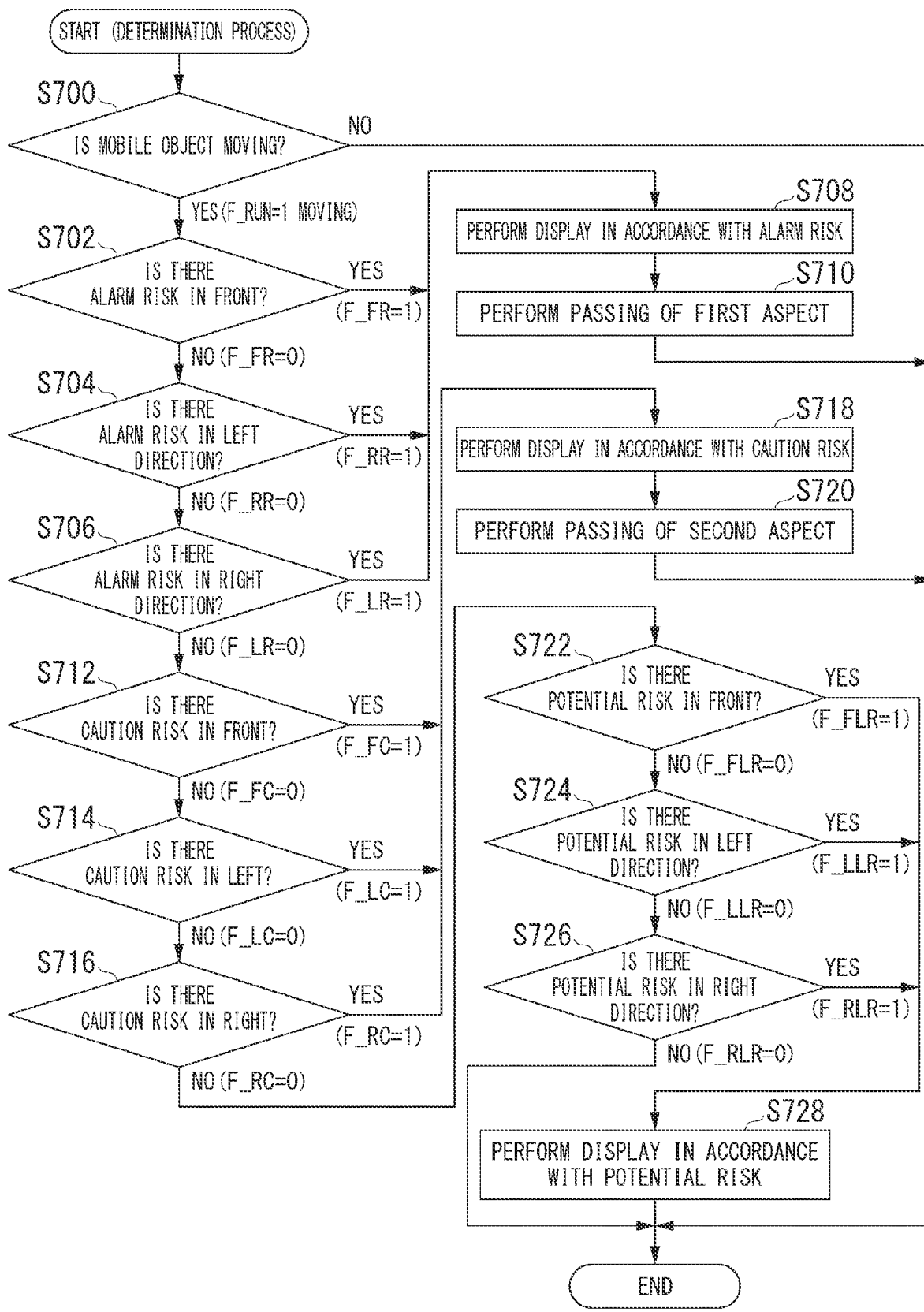
FIG. 24 is a flowchart showing an example of a flow of a process for alarm/caution.

FIG. 24 is a flowchart showing an example of a flow of a process (determination process) for alarm/caution. The processor 20 determines whether the own vehicle is moving (step S700). When the own vehicle is not moving, one routine of the flowchart ends.

Process Related to Alarm Risk

When the own vehicle is moving, the processor 20 determines whether there is an alarm risk in front (step S702). When there is no front alarm risk, the processor 20 determines whether there is an alarm risk in the left direction (step S704). When there is no alarm risk in the left direction, the processor 20 determines whether there is an alarm risk in the right direction (step S706).

When there is the alarm risk in front, the alarm risk in the left direction, or the alarm risk in the right direction, the notifier 30 executes display in accordance with the alarm risk (step S708) and further executes passing of a first mode (step S710). As described above in FIGS. 17, 19, and 21, when the flag "F_FR=1 (a flag indicating that there is an alarm risk in front)" "F_LR=1 (a flag indicating that there is an alarm risk in the left direction)," or "F_RR=1 (a flag indicating that there is an alarm risk in the right direction)" is set, the processes of steps S708 and S710 are executed. The details will be described with reference to FIGS. 25 and 26 to be described below.

Process Related to Caution Risk

When there is no alarm risk in the right direction, the processor 20 determines whether there is a caution risk in front (step S712). When there is no caution risk in front, the processor 20 determines whether there is a caution risk in front, the processor 20 determines whether there is a caution risk in the left direction (step S714). When there is no caution risk in the left direction, the processor 20 determines whether there is a caution risk in the right direction (step S716).

When there is the caution risk in front, the caution risk in the left direction, or the caution risk in the right direction, the notifier 30 executes display in accordance with the caution risk (step S718) and further executes passing of the second mode (step S720). As described above in FIGS. 17, 19, and 21, when the flag "F_FC=1 (a flag indicating that there is a caution risk in front)" "F_LC=1 (a flag indicating that there is a caution risk in the left direction)," or "F_RC=1 (a flag indicating that there is a caution risk in the right direction)" is set, the processes of steps S718 and S720 are executed. The details will be described with reference to FIG. 27 to be described below.

Process Related to Potential Risk

When there is no caution risk in the right direction, the processor 20 determines whether there is a potential risk in front (step S722). When there is no potential risk in front, the processor 20 determines whether there is a potential risk in the left direction (step S724). When there is no potential risk in the left direction, the processor 20 determines whether there is a potential risk in the right direction (step S726).

When there is the potential risk in front, the potential risk in the left direction, or the potential risk in the right direction, the notifier 30 executes display in accordance with the potential risk (step S728). As described above in FIGS. 17, 19, and 21, when the flag "F_FLR=1 (a flag indicating that there is a potential risk in front)" "F_LLR=1 (a flag indicating that there is a potential risk in the left direction)," or "F_RLR=1 (a flag indicating that there is a potential risk in the right direction)" is set, the process of step S728 is executed. The details will be described with reference to FIG. 28 to be described below. Then, the process of one routine of the flowchart ends.

Notification of Alarm Risk (First Alert Level)

Figure 25:
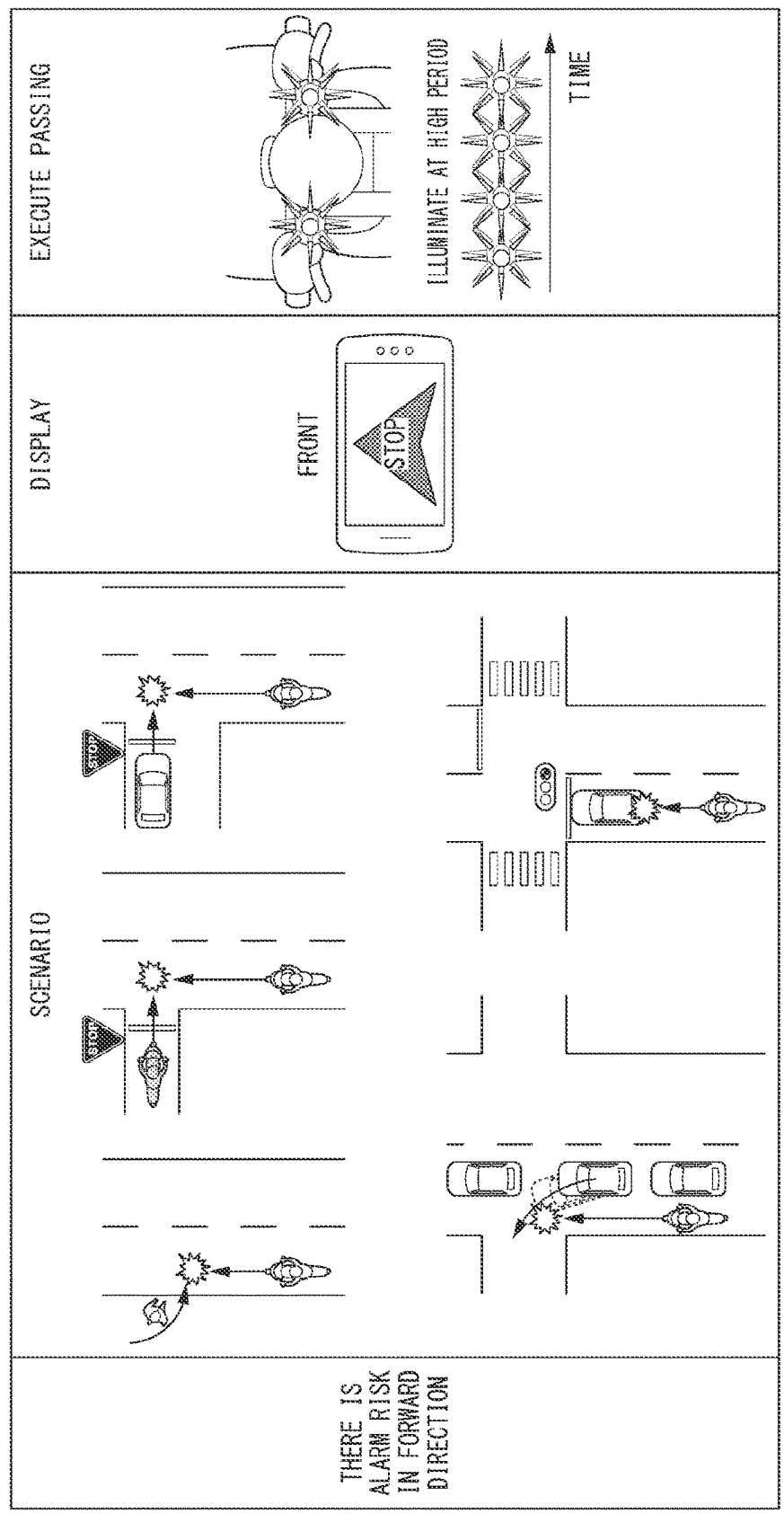
FIG. 25 is a diagram showing a scenario and a notification in which a front alarm risk occurs.

FIG. 25 is a diagram showing a scenario and a notification in which an alarm risk in the forward direction occurs. When there is an alarm risk in the forward direction, the notifier 30 displays alarm information indicating that there is the alarm risk in the forward direction on the display and further executes the passing of the first mode. This alarm display is predetermined display such as an arrow (for example, a red arrow) indicating the forward direction, as shown. The first mode is a mode in which the passing light PL illuminates at a high period.

Figure 26:
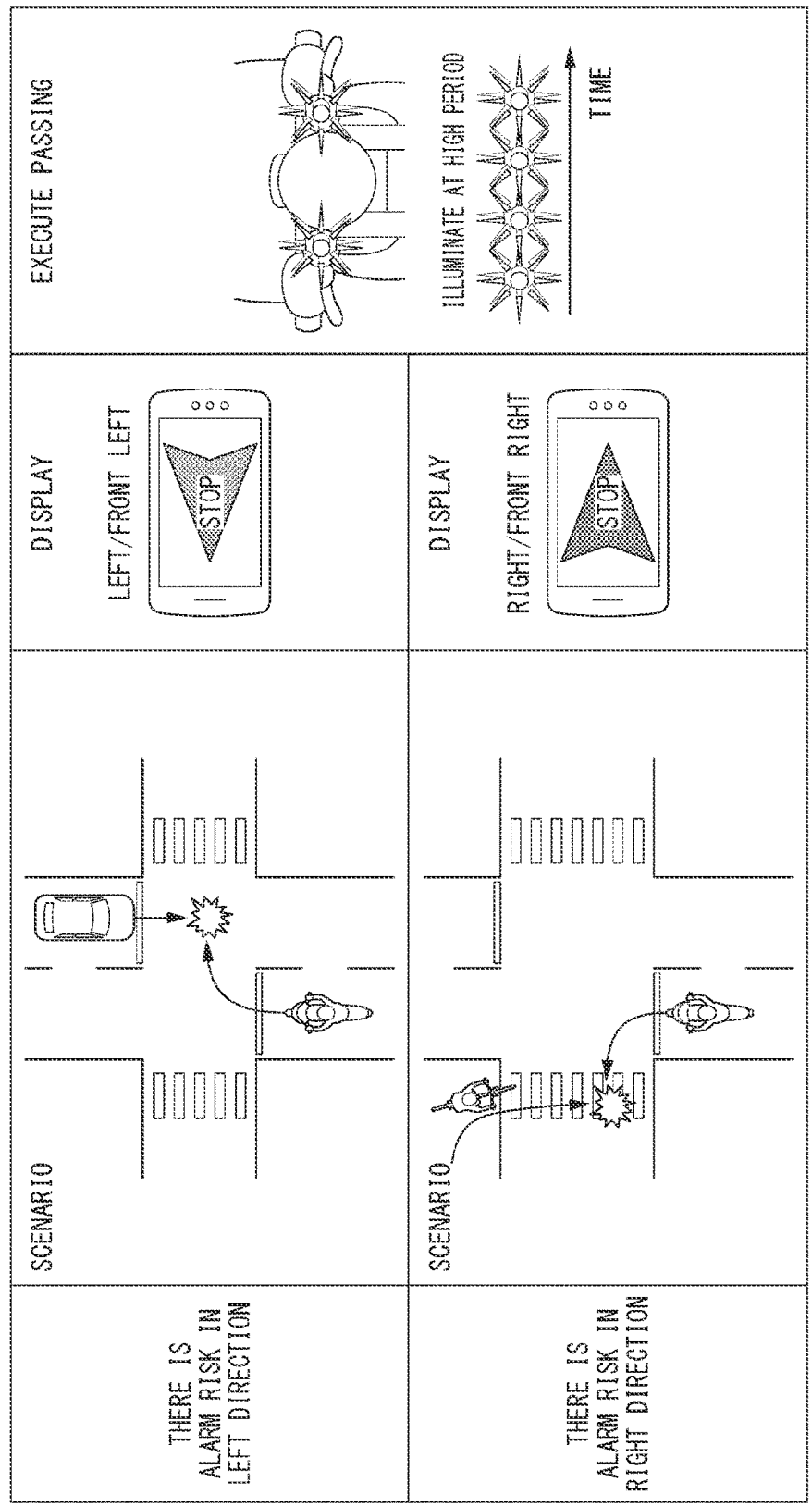
FIG. 26 is a diagram showing a scenario and a notification in which a left alarm risk or a right alarm risk occurs.

FIG. 26 is a diagram showing a scenario and a notification in which an alarm risk in the left direction or an alarm risk in the right direction occurs. When there is the alarm risk in the left direction, the notifier 30 displays alarm information indicating that there is the alarm risk in the left direction on the display and further executes the passing of the first mode. This alarm display is predetermined display such as an arrow (for example, a red arrow) indicating the left direction, as shown.

When there is the alarm risk in the right direction, the notifier 30 displays alarm information indicating that there is the alarm risk in the right direction on the display and further executes the passing of the first mode. This alarm display is predetermined display such as an arrow (for example, a red arrow) indicating the right direction, as shown.

Notification of Caution Risk (Second Alert Level)

Figure 27:
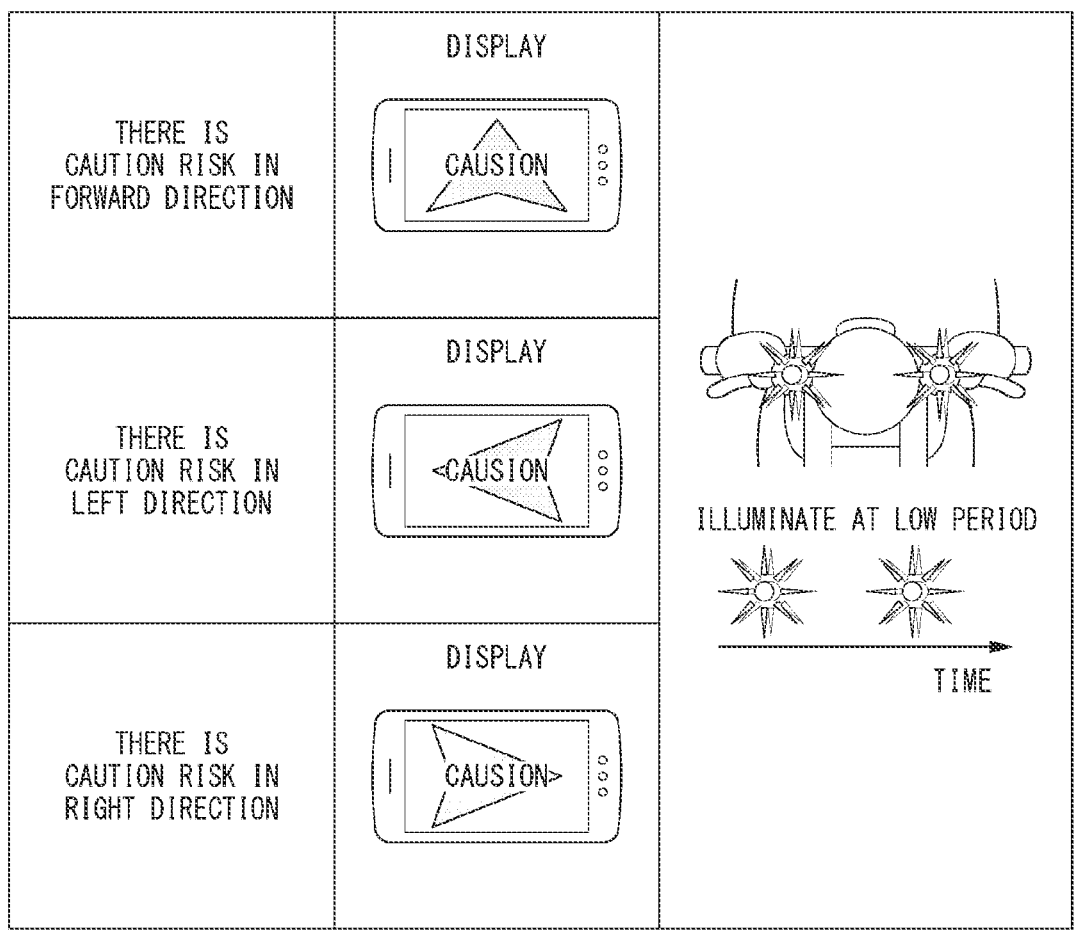
FIG. 27 is a diagram showing a scenario and a notification in which a caution risk occurs.

FIG. 27 is a diagram showing a scenario and a notification in which a caution risk occurs. When there is caution risk in the forward direction, the notifier 30 displays caution information indicating that there is a caution risk in the forward direction on the display and further executes the passing of the second mode. This caution display is predetermined display such as an arrow (for example, a yellow arrow) indicating the forward direction, as shown. The second mode is a mode in which the passing light PL illuminates at a low period.

When there is a caution risk in the left direction, the notifier 30 displays caution information indicating that there is a caution risk in the left direction on the display and further executes the passing of the second mode. This alarm display is predetermined display such as an arrow (for example, a yellow arrow) indicating the left direction, as shown.

When there is a caution risk in the right direction, the notifier 30 displays caution information indicating that there is a caution risk in the right direction on the display and further executes the passing of the second mode. This alarm display is predetermined display such as an arrow (for example, a yellow arrow) indicating the right direction, as shown. In a case in which there is the caution risk, as described above, a color of an image (an image such as an arrow indicating an alert) displayed on the display is different from a color of an image (an image such as an arrow indicating an alert) displayed on the display in a case in which there is the alarm risk.

Notification of Potential Risk (Third Alert Level)

FIG. 28 is a diagram showing a scenario and a notification in which a potential risk occurs. When there is a potential risk in the forward direction, the notifier 30 displays potential risk information indicating that there is a potential risk in the forward direction on the display. This potential risk display is predetermined display such as an arrow (for example, a yellow arrow) indicating the forward direction, as shown.

When there is a potential risk in the left direction, the notifier 30 displays potential risk information indicating that there is a potential risk in the left direction on the display. This potential risk display is predetermined display such as an arrow (for example, a yellow arrow) indicating the forward direction, as shown. When there is the potential risk, there is no traffic participants that are approaching. Therefore, the passing is not executed.

In the foregoing example, the camera and the display provide in the terminal device SP have been described, but one or both of the camera and the display may not be provided in the terminal device SP and may be provided in another device, a mobile object, or the like. In this case, the terminal device SP executes communication with the other device or the mobile object, acquires an image, or display information on the display.

In the foregoing embodiment, as described above, it is determined whether the alert level is the first alert level or the second alert level and different information is provided between the first alert level and the second alert level. However, instead of (or in addition to) this, the application program may not determine whether the alert level is the first alert level or the second alert level and may display information regarding the alert on the display in a case of a situation requiring alert (when the alert level is equal to or greater than a predetermined level). Further, in this case, the application program may execute passing. The situation requiring alert is a situation in which the alert level is the first alert level, a situation in which the alert level is the second alert level, or a situation in which there is a potential risk.

According to the above-described embodiment, an application program causes a computer of a terminal device equipped with a camera and mounted in a mobile object to execute a process of acquiring an image; a process of determining an alert level for an operator of the mobile object is a first alert level or a second alert level that is a level lower than the first alert level based on a surrounding situation of the mobile object obtained from the image; and a process of displaying information appropriate to the alert level on a display provided on a casing in which the camera of the terminal device is provided in accordance with a result of the determination. Thus, it is possible to improve convenience for a user.

According to the above-described embodiment, an application program causes a computer of a terminal device equipped with a camera and mounted in a mobile object to execute a process of acquiring images acquired at different times, a process of estimating whether the mobile object has an intention to turn right or left based on the images captured at the different times, and a process of displaying an image for reporting presence of traffic participants on a display provided on a casing in which the camera of the terminal device is provided based on a result of the estimation. Thus, it is possible to estimate the intention of a behavior of the mobile object more accurately.

The embodiments for carrying out the present invention have been described above, but the present invention is not limited to the embodiments. Various modifications and substitutions can be made within the scope of the present invention without departing from the gist of the present invention.

What is claimed is:

1. An information supply method of causing a computer of a terminal device equipped with a camera and mounted in a mobile object to execute:
   a process of acquiring an image;
   a process of determining an alert level for an operator of the mobile object is a first alert level or a second alert level that is a level lower than the first alert level based on a surrounding situation of the mobile object obtained from the image; and
   a process of displaying information appropriate to the alert level on a display provided on a casing in which the camera of the terminal device is provided in accordance with a result of the determination,
   wherein the method causes the computer to further execute:
   a process of displaying an image of a first color on the display when the alert level is the first alert level; and
   a process of displaying an image of a second color different from the first color when the alert level is a second alert level lower than the first alert level.

2. An information supply method of causing a computer of a terminal device equipped with a camera and mounted in a mobile object to execute:
   a process of acquiring an image;
   a process of determining whether an alert level for an operator of the mobile object is equal to or higher than a predetermined level based on a surrounding situation of the mobile object obtained from the image; and
   a process of displaying information indicating that the alert level is equal to or higher than the predetermined level on a display provided on a casing in which the camera of the terminal device is provided and causing a light-emitting device to execute passing when the alert level is equal to or higher than the predetermined level, wherein the method causes the computer to further execute:
  a process of displaying an image of a first color on the display when the alert level is the first alert level; and
  a process of displaying an image of a second color different from the first color when the alert level is a second alert level lower than the first alert level.

3. The information supply method according to claim 1, wherein the method causes the computer to further execute:
  a process of determining a direction in which the operator is alert based on the surrounding situation; and
  a process of displaying an image indicating that the alert direction on the display.

4. The information supply method according to claim 1, wherein the method causes the computer to further execute:
  a process of determining whether the alert level is a first alert level, a second alert level lower than the first alert level, or a third alert level lower than the second alert level, based on the surrounding situation; and
  a process of displaying information appropriate to the alert level on the display in accordance with a result of the determination.

5. The information supply method according to claim 1, wherein the method causes the computer to further execute:
  a process of determining that the alert level is the first alert level when a traffic participant being gazed at is present within a range of a first distance from the terminal device or is present within a range of the first distance within a predetermined time from a present time; and
  a process of determining that the alert level is a second alert level lower than the first alert level when the traffic participant is present within a range of a second distance more away than the first distance from the terminal device and is not present within the range of the first distance from the terminal device or is predicted to be present within the range of the second distance within the predetermined time from the present time and is not present within the range of the first distance within the predetermined time from the present time.

6. The information supply method according to claim 1, wherein the method causes the computer to further execute:
  determining that the alert level is equal to or higher than a predetermined level and displaying the information on the display when a traffic participant is present or predicted to be present in an alert region which is a range of a predetermined angle at which a reference direction is a reference;
  setting the alert region in front of the mobile object when the mobile object is traveling straight ahead;
  setting the alert region in front of and in a left direction from the mobile object when the mobile object turns left; and
  setting the alert region in front of and in a right direction of the mobile object when the mobile object turns right.

7. The information supply method according to claim 6, wherein the method causes the computer to further execute:
  determining that the alert level is the first alert level when traffic participants are present or predicted to be present in regions a, b, and c or, and displaying information regarding the first alert level in accordance with the regions in which the traffic participants are present or predicted to be present on the display; and
  determining that the alert level is a second alert level lower than the first alert level when traffic participants are present or predicted to be present in regions d, e, and f, and displaying information regarding the second alert level on the display in accordance with the regions in which the traffic participants are present or predicted to be present,
  wherein the region a is a range of a first angle at which the reference direction is a reference and is a range of a first distance from the terminal device,
  wherein the region b is a range between the first angle in a left direction of the reference direction and a second angle greater than the first angle at which the reference direction is a reference, and is a range of the first distance,
  wherein the region c is a range between the first angle in a right direction of the reference direction and the second angle at which the reference direction is a reference, and is the range of the first distance,
  wherein the region d is a range between the first angle and the second angle at which the reference direction is a reference, and is a range between the first distance to a second distance more away than the first distance from the terminal device,
  wherein the region e is a range between the first angle in the left direction of the reference direction and the second angle, and is a range between the first and second distances, and
  wherein the region f is a range between the first angle in the right direction of the reference direction and the second angle, and is a range between the first and second distances.

8. The information supply method according to claim 7, wherein the method causes the computer to further execute:
  displaying information indicating an alert in a forward direction, a left direction, or a right direction from the mobile object at the first alert level on the display when traffic participants are present or predicted to be in the regions a, b, and c; and
  displaying information indicating that the forward direction, the left direction, or the right direction of the mobile object is alert at the second alert level on the display when traffic participants are present or predicted to be in the regions d, e, and f.

9. The information supply method according to claim 1, wherein the method causes the computer to further execute:
  a process of determining whether the alert level is the first alert level, a second alert level lower than the first alert level, or a third alert level lower than the second level based on the surrounding situation; and
  a process of determining that the alert level is the third alert level when there is a row of objects which are present near the mobile object and extend in a direction identical to a traveling direction of the mobile object.

10. The information supply method according to claim 9, wherein the method causes the computer to further execute:
  determining that the alert level is the third alert level when a distance between the extending objects is equal to or less than a first threshold and a transverse distance between the extending objects and the mobile object is equal to or less than a second threshold.

11. The information supply method according to claim 1, wherein the method causes the computer to further execute:
  a process of determining whether the alert level is the first alert level, a second alert level lower than the first alert level, or a third alert level lower than the second level based on the surrounding situation; and
  a process of determining that the alert level is the third alert level when the mobile object traveling on a first road enters a second road connected to the first road and objects are present before and after a connection portion of the first and second roads in an extension direction of the first road on the first road.

12. The information supply method according to claim 11, wherein the method causes the computer to further execute:
determining that the alert level is the third alert level when a distance between the object which will enter the connection portion among the objects before and after the connection portion and an object behind that object is equal to or less than a third threshold.

13. The information supply method according to claim 1, wherein the method causes the computer to further execute:
causing a light-emitting device controlled based on an instruction from the computer to execute passing in accordance with the alert level.

14. The information supply method according to claim 13, wherein the light-emitting device is provided in a mobile object which is a two-wheeled vehicle and is able to communicate with the computer, and
wherein the computer further causes the light-emitting device to execute communication and execute passing.

15. The information supply method according to claim 13, wherein the computer shortens a period of the passing when the alert level is the first alert level than when the alert level is a second alert level lower than the first alert level.

16. The information supply method according to claim 13, wherein the computer further executes a process of determining whether the alert level is the first level, a second alert level lower than the first alert level, and a third alert lever lower than the second alert level, based on the surrounding situation,
wherein the computer further executes a process of determining that the alert level is the third alert level when there is a row of objects which are present near the mobile object and extend in a direction identical to a traveling direction of the mobile object or a process of determining that the alert level is the third alert level when the mobile object traveling on a first road enters a second road connected to the first road and objects are present before and after a connection portion of the first and second roads in an extension direction of the first road on the first road,
wherein the information is displayed on the display and the passing is executed when the alert level is the first or second alert level, and
wherein the information is displayed on the display without executing the passing when the alert level is the third alert level.

17. A non-transitory computer storage medium storing an application program causing a computer of the terminal device to execute a process of:
acquiring an image;
determining an alert level for an operator of a mobile object is a first alert level or a second alert level that is a level lower than the first alert level based on a surrounding situation of the mobile object obtained from the image; and
displaying information appropriate to an alert level on a display in accordance with a result of the determination,
displaying an image of a first color on the display when the alert level is the first alert level; and
displaying an image of a second color different from the first color when the alert level is a second alert level lower than the first alert level.

* * * * *